(12) United States Patent
Bradley

(10) Patent No.: US 11,325,661 B2
(45) Date of Patent: May 10, 2022

(54) TRAILER FAIRING AND SYSTEM FOR IMPROVED AERODYNAMIC PERFORMANCE

(71) Applicants: Compagnie Generale des Etablissements Michelin, Clermont-Ferrand (FR); Calvin Rhett Bradley, Greenville, SC (US)

(72) Inventor: Calvin Rhett Bradley, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/976,853

(22) PCT Filed: Mar. 1, 2019

(86) PCT No.: PCT/US2019/020370
§ 371 (c)(1),
(2) Date: Aug. 31, 2020

(87) PCT Pub. No.: WO2019/169311
PCT Pub. Date: Sep. 6, 2019

(65) Prior Publication Data
US 2020/0406988 A1 Dec. 31, 2020

Related U.S. Application Data

(63) Continuation of application No. PCT/US2018/020730, filed on Mar. 2, 2018.

(51) Int. Cl.
*B62D 35/00* (2006.01)
*B62D 37/02* (2006.01)
*B62D 53/06* (2006.01)

(52) U.S. Cl.
CPC ......... *B62D 35/001* (2013.01); *B62D 35/007* (2013.01); *B60Y 2200/145* (2013.01); *B62D 37/02* (2013.01); *B62D 53/068* (2013.01)

(58) Field of Classification Search
CPC ........ B62D 35/00; B62D 53/06; B62D 25/18; B62D 35/001; B62D 35/007; B62D 37/02; B62D 53/068; B60Y 2200/145
See application file for complete search history.

(56) References Cited

U.S. PATENT DOCUMENTS 3,960,402 A 6/1976 Keck
3,999,797 A 12/1976 Kirsch
(Continued)

FOREIGN PATENT DOCUMENTS

CA 2715137 A1 3/2011
CN 105829134 A * 8/2016 ............. F03D 80/00
(Continued)

OTHER PUBLICATIONS

European Patent Office; International Search Report and Written Opinion for patent application PCT/US2019/020352, filed Mar. 1, 2019; Publisher: European Patent Office, Rijswijk, Netherlands; dated May 28, 2019; pp. 1-20, enclosed pp. 1-18.
(Continued)

*Primary Examiner* — Lori L Lyjak
(74) *Attorney, Agent, or Firm* — Neal P. Pierotti

(57) ABSTRACT

An apparatus for a trailer is provided that has a top fairing configured for being mounted to a top surface of the trailer at a location closer to the back of the trailer than the front of the trailer. The trailer has a longitudinal direction, a lateral direction, and a vertical direction. First and second side fairings are also included and are configured for being mounted to respective first and second side surfaces of the trailer. Additionally, first and second trailer skirts are con-
(Continued)

figured for being carried by the trailer and are part of the apparatus. First and second trailer rear skirts are likewise included and are located rearward of the first and second trailer skirts. The combination of components provides aerodynamic benefit to the trailer.

19 Claims, 23 Drawing Sheets

(56) References Cited

U.S. PATENT DOCUMENTS

| | | | |
|---|---|---|---|
| 4,022,508 A | 5/1977 | Saczawa, Jr. | |
| 4,057,280 A | 11/1977 | Maccready, Jr. | |
| 5,240,306 A | 8/1993 | Flemming | |
| 5,280,990 A | 1/1994 | Rinard | |
| 5,564,750 A | 10/1996 | Bajorek | |
| 6,959,958 B2 | 11/2005 | Basford | |
| 7,497,502 B2 | 3/2009 | Wood | |
| 7,578,541 B2 | 8/2009 | Layfield | |
| 8,251,436 B2 | 8/2012 | Henderson | |
| 8,684,447 B2 | 4/2014 | Henderson | |
| 8,783,757 B2 | 7/2014 | Henderson | |
| 8,899,660 B1 | 12/2014 | Praskovskaya | |
| 9,457,847 B2 | 10/2016 | Smith | |
| 9,637,184 B1 | 5/2017 | Bennett | |
| 2008/0061598 A1* | 3/2008 | Reiman | B62D 35/001 296/180.4 |
| 2009/0189414 A1 | 7/2009 | Boivin | |
| 2009/0236872 A1 | 9/2009 | Wood | |
| 2010/0164249 A1 | 7/2010 | Nusbaum | |
| 2010/0264690 A1 | 10/2010 | Brown | |
| 2011/0062749 A1 | 3/2011 | Graham | |
| 2015/0197291 A1 | 7/2015 | Roush | |
| 2015/0259014 A1 | 9/2015 | Baker | |
| 2017/0029044 A1 | 2/2017 | Senatro | |

FOREIGN PATENT DOCUMENTS

| | | |
|---|---|---|
| EP | 3284662 A1 | 2/2018 |
| GB | 2074107 B | 10/1981 |
| GB | 2511871 A | 9/2014 |
| JP | H0350593 B2 | 8/1991 |
| JP | 2013052762 A | 3/2013 |
| KR | 20110036969 A | 4/2011 |
| WO | 2004062953 A2 | 7/2004 |
| WO | 2011034535 A1 | 3/2011 |
| WO | 2012099569 A1 | 7/2012 |
| WO | 2014074536 A1 | 5/2014 |
| WO | 2014162158 A2 | 10/2014 |
| WO | 2016083997 A1 | 6/2016 |

OTHER PUBLICATIONS

European Patent Office; International Search Report and Written Opinion for patent application PCT/US2018/020698, filed Mar. 2, 2018; Publisher: European Patent Office, Rijswijk, Netherlands; dated Oct. 31, 2018, pp. 1-18, enclosed.

* cited by examiner

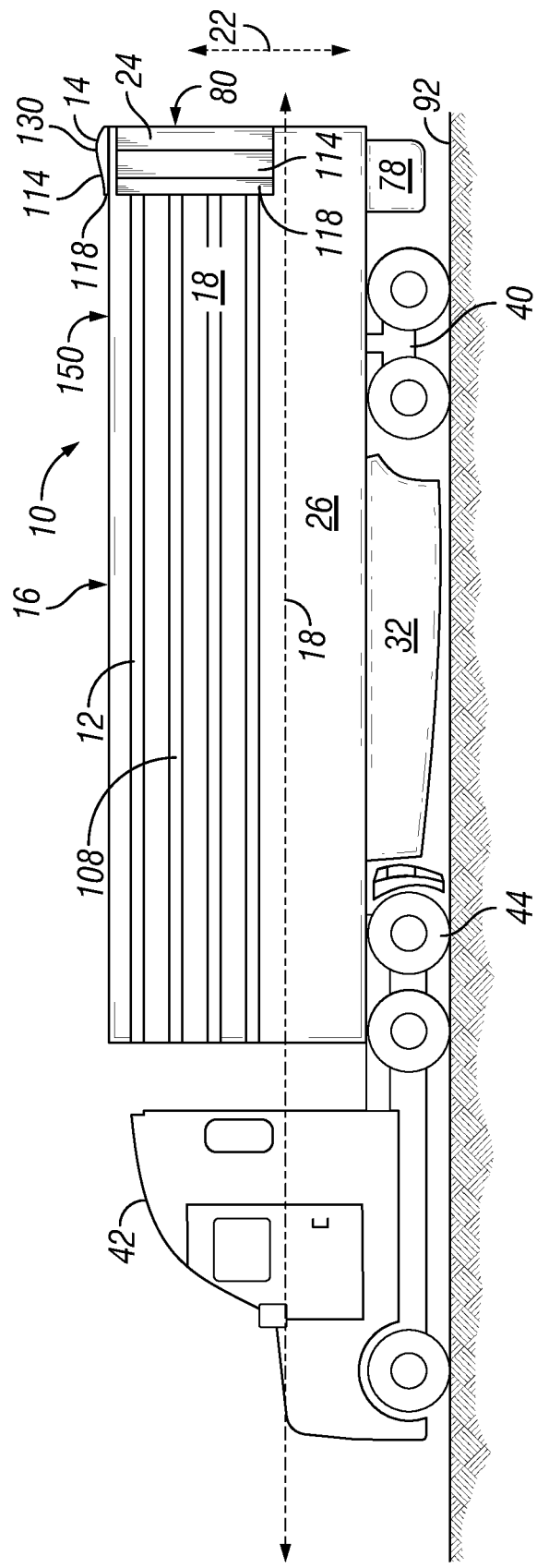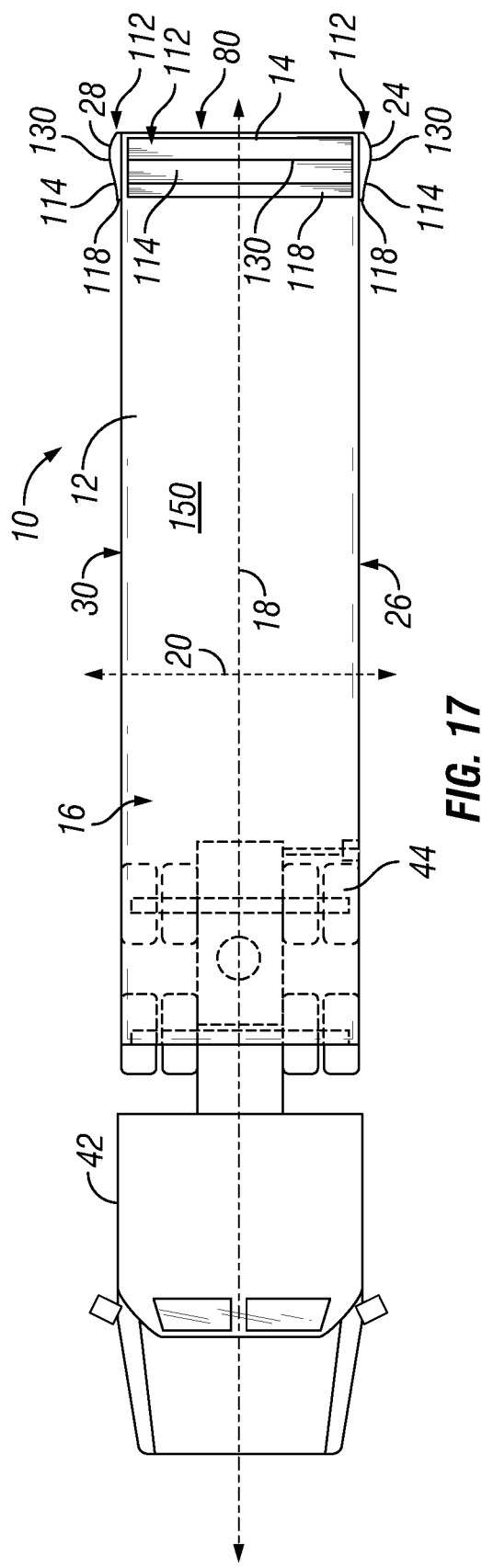
FIG. 16
FIG. 17

TRAILER FAIRING AND SYSTEM FOR IMPROVED AERODYNAMIC PERFORMANCE

CROSS-REFERENCE TO RELATED APPLICATIONS

The present application is a 35 U.S.C. § 371 application of PCT/US19/20370 filed on Mar. 1, 2019 and entitled "Trailer Fairing and System for Improved Aerodynamic Performance." PCT/US19/20370 claims the benefit of PCT/US18/20730 filed on Mar. 2, 2018 and entitled "Trailer Fairing and System for Improved Aerodynamic Performance." PCT/US19/20370 and PCT/US18/20730 are both incorporated by reference herein in their entireties for all purposes.

FIELD OF THE INVENTION

The subject matter of the present invention relates to an end of trailer fairing and system that improves aerodynamic performance of the trailer. More particularly, the present application involves an end of trailer fairing that features a top fairing, side fairings, front trailer skirts, and trailer rear skirts.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. For maximum capacity, the trailer is box shaped which is not the most aerodynamically available option. Further, the rear door of the trailer is made in a particular manner to facilitate loading and unloading, such as utilizing a large opening, and the rear door may not have optimal aerodynamic properties. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced and permits the trailer to be towed more efficiently, increasing the gas mileage and performance of the vehicle and its cargo. Other ways of improving aerodynamic performance of the trailer involves the provision of fairings to the end of the trailer. The fairings modify the airflow around or off of the end of the trailer to reduce drag. It is known to produce fairings that extend a good bit (5 inches or more) off the back end of the trailer for the purposes of reducing drag. Boat tails are devices arranged at the back end of the trailer to help converge and stabilize the wake at the back of the trailer for improved aerodynamic performance.

Combining all of these various aerodynamic elements is problematic because the local aerodynamics of the vehicle are impacted by the geometry of the entire vehicle. Some devices may improve performance when used by themselves, but have no impact on performance when used with other devices. This may be because a particular component is designed to maximize its individual contribution to fuel savings, and is not designed to work together optimally with other components in the system. Aerodynamic components of a trailer that include moving parts will require maintenance, and drivers may be required to remember to deploy some other types of aerodynamic devices. Also, the placement of various devises far off the back end of the trailer adds to the length of the trailer increasing the risk of damage to these components and surrounding vehicles. It would be desirable to have an aerodynamic system that incorporates a trailer end fairing and other components in an optimal manner for purposes of increasing the aerodynamic performance of the trailer. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 16 is a side view of a truck hauling a trailer with fairings located at the rearward end of the trailer in accordance with another exemplary embodiment.

FIG. 17 is a top view of FIG. 16.

The use of identical or similar reference numerals in different figures denotes identical or similar features.

DETAILED DESCRIPTION OF THE INVENTION

Figure 1:
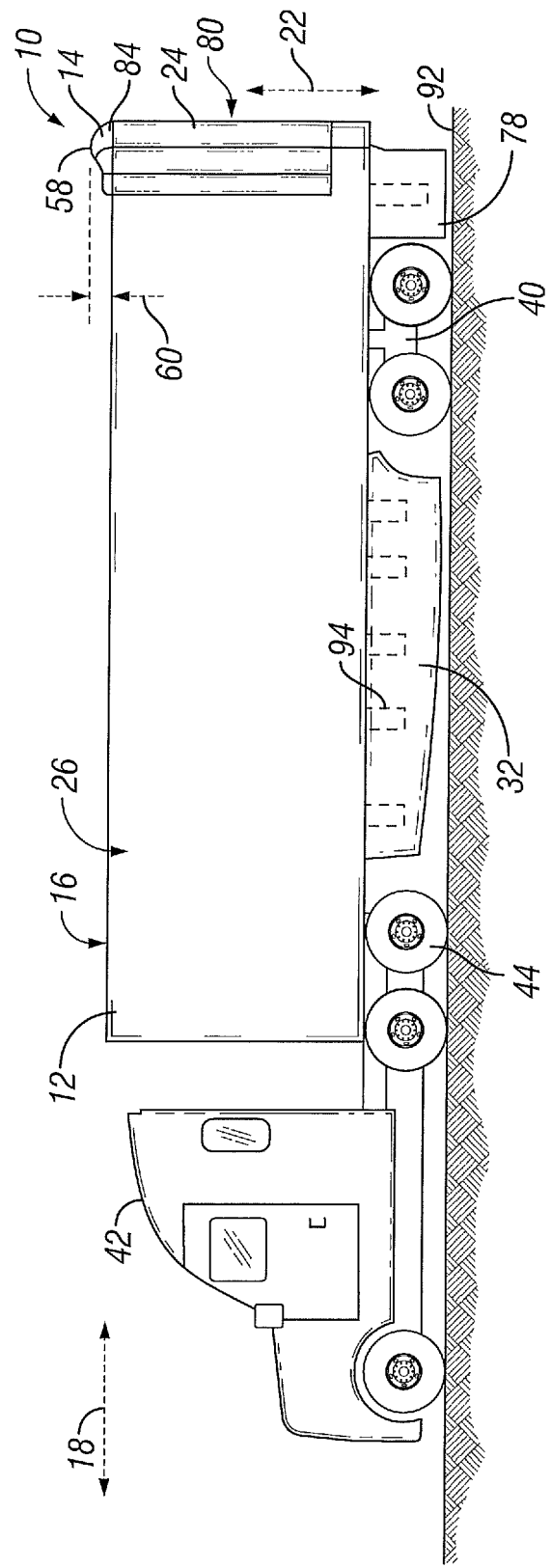
FIG. 1 is a side view of a tractor hauling a trailer that includes an apparatus with skirts parallel to sides of the trailer in accordance with one exemplary embodiment.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that achieves aerodynamic performance of a trailer 12 when driven by a tractor 42. The apparatus 10 includes a top fairing 14, a first side fairing 24, and a second side fairing 28 located at the back of the trailer 12. The side fairings 24, 28 may or may not engage the top fairing 14 such that a gap may or may not be present between them and a continuous surface may or may not extend from the side fairings 24, 28 onto the top fairing 14. In other words, the top fairing 14 could in some instances connect to both of the side fairings 24, 28 to form a continuous surface at the back section of the trailer 12, and in other instances gaps could be present between the side fairings 24, 28 and the top fairing 14. The apparatus 10 also includes first and second trailer skirts 32, 36 in addition to the top fairing 14 and side fairings 24, 28 to further enhance aerodynamic performance. Yet further, the apparatus 10 includes trailer rear skirts 78, 82 to achieve airflow properties upon normal use of the tractor 42 trailer 12. Additional features can be incorporated into the system the apparatus 10 comprises as will be discussed in order to achieve different aerodynamic properties of the trailer 12.

The fairings consist of a half airfoil attached or touching the top and/or side of the trailer. Extending away from the flat plane of the side or top of the trailer then curving towards the side or top panel. They are between 0.1" and 3" at their thickest part, and may or may not extend off the back of the trailer. They should end at the rear edge of the trailer or extend off the back by up to 5" and preferably less than 3". Preferred lengths from front to back are approximately 10" to 38" long. These fairings are configured such that airflow flows over the outer surface. This means that there is only one functional surface instead of previous inventions which show a wing that has airflow both over and under functional surfaces.

Figure 2:
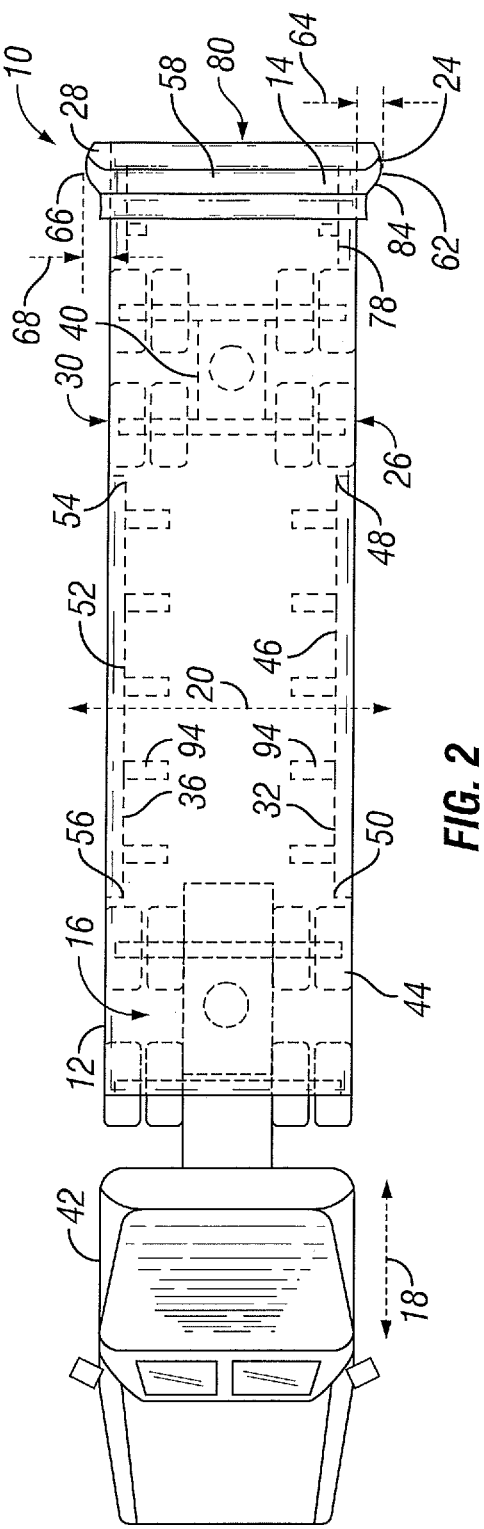
FIG. 2 is a top view of FIG. 1.

FIGS. 1 and 2 show a tractor 42 with attached trailer 12 on the ground 92. In normal use, the tractor 42 is driven forward in the longitudinal direction 18 and aerodynamic features of the system are designed to handle this forward motion. Cross flow of air will be imparted onto the trailer 12 in the lateral direction 20 and the apparatus 10 may include features addressed to this cross-flow. The first side fairing 24 is located at the back of the trailer 12 in the longitudinal direction 18 and is mounted onto or over the first side surface 26 of the trailer 12. In a similar manner, the second side fairing 28 is mounted on or over the second side surface 30 of the trailer 12. The top fairing 14 is mounted on or over a portion of the top surface 16 of the trailer 12. The fairings 14, 24, 28 are located closer to the back end 80 of the trailer 12 in the longitudinal direction 18 than to the front of the trailer 12. In some instances, the fairings 14, 24, 28 could extend to the back end 80 of the trailer 12, and in yet other embodiments one or more of the fairings 14, 24, 28 could extend rearward of the back end 80 of the trailer 12 up to 3 inches in the longitudinal direction 18. The upper surfaces of the fairings 14, 24, 28 may have flat, angled, or curved sections so that airflow over them will achieve certain aerodynamic performance when the trailer 12 is driven. The top fairing 14 extends across the entire width of the top surface 16 in the lateral direction 20, but the side fairings 24, 28 extend along a majority of the height of the side surfaces 26, 30 in the vertical direction 22 but not along the entire height of the side surfaces 26, 30 in the vertical direction 22. In some instances, the fairings 24, 28 extend from ½ to ⅘ of the heights of the side surfaces 26, 30 in the vertical direction 22. This amount of coverage can be measured downward in the vertical direction 22 starting from the top surface 16. The fairings 14, 24, 28 are structures that can be curved panels that attach at a leading edge to the top surface 16 and side surfaces 26, 30 in such a way that the fairings 14, 24, 28 curve or otherwise extend away from the surface 16, 26, 30 in question and then curve or otherwise extend back to the surface 16, 26, 30 in question. This extension away from and then back to can be viewed in the forward to rearward direction in the longitudinal direction 18.

The side fairings 24, 28 engage the top fairing 14 in the discussed embodiment. This engagement may be along the entire lengths of the side fairings 24, 28 in the longitudinal direction 18 or may be less than along their entire lengths. There could be gaps in the engagement of the side fairings 24, 28 to the top fairing 14 along a portion of their lengths in some instances. Further, there could be cases where one or two of the fairings 14, 24, 28 are longer than the other one or two and in these instances there would be longitudinal sections that are not in engagement. Further, additional designs exist in which one of the two side fairings 24, 28 does not engage the top fairing 14 at all, but the other one of the two side fairings 24, 28 does in fact engage the top fairing 14. The engagement between the side fairings 24, 28 and the top fairing 14 may be form a 90 degree bend, or there could be convex surfaces between these components 14, 24, 28 that achieve a smoother transition at their engagement locations, or a combination of various geometric designs can be present at the points of engagement. Engagement of the top fairing 14 with at least one of the side fairings 24, 28 achieves a desired aerodynamic performance of the trailer 12 during normal use. The fairings 14, 24, 28 can be mounted onto the surfaces 16, 26, 30 through the use of screws, bolts, adhesives, mechanical fasteners or even through integral formation in some instances and may or may not engage the surfaces 16, 26, 30.

Trailer skirts 32, 36 are part of the apparatus 10 and work with the fairings 14, 24, 28 in achieving aerodynamic performance of the trailer 12. It has been discovered that the apparatus 10 having the fairings 14, 24, 28 work particularly well with the addition of the trailer skirts 32, 36 to the apparatus 10. The trailer skirts 32, 36 are located rearward of drive tires 44 of the tractor 42 in the longitudinal direction 18 and are located at the bottom of the trailer 12 and function to direct airflow at least partially from the bogie assembly 40 of the trailer 12. The trailer skirts 32, 36 are panels that have surfaces that can be variously shaped that direct airflow accordingly. The panels of the trailer skirts 32, 36 in FIGS. 1 and 2 are parallel to the side surfaces 26, 30 of the trailer 12. In this regard, the trailer skirt 32 is closer to side surface 26 than to side surface 30 and is parallel to side surface 26. In a similar vein, trailer skirt 36 is closer to side surface 30 than to side surface 26 and is parallel thereto. The trailer skirts 32, 36 are located completely rearward of the drive tires 44 and completely forward of the bogie assembly 40 in the longitudinal direction 18. However, in other embodiments, a portion of the trailer skirts 32, 36 could extend to the bogie assembly 40 so that they are not completely forward of the bogie assembly 40. The trailer skirts 32, 36 can be connected or held onto the trailer 12 by any mechanism. For example, brackets 94 are present to bolt the trailer skirts 32, 36 onto the underside of the trailer 12.

The first trailer skirt 32 has a rearward most point 48 in the longitudinal direction 18 for redirecting airflow. Further, the first trailer skirt 32 has a forward most point 50 for redirecting airflow in the longitudinal direction 18. In evaluating the parallel nature of the first trailer skirt 32 to the first side surface 26, a first line 46 is drawn from the rearward most point 48 to the forward most point 50. The first side surface 26 is parallel to the longitudinal direction 18 in that the trailer 12 is box shaped and extends effectively in the longitudinal direction 18 regardless of whether the side surfaces 26, 30 are completely flat or have grooves or other features thereon. One can compare the angle the first line 46 makes to the line the first side surface 26 forms when viewed in the top view of FIG. 2 and ascertain that these two lines 46, 26 are parallel.

The second trailer skirt 36 has a rearward most point 54 that is the part of this component located most rearward in the longitudinal direction 18 that functions to redirect air. Likewise, the second trailer skirt 36 has a forward most point 56 for directing airflow in the longitudinal direction 18. A second line 52 can be drawn from the rearward most point 54 to the forward most point 56. The line that the second side surface 30 makes when viewed from the top in FIG. 2 is observed to be parallel to the second line 52. In this manner, the first and second trailer skirts 32, 36 can be said to be arranged in a parallel manner to the first and second side surfaces 26 and 30 and the panels that direct airflow are flat with no change in angular orientation. Although the two trailer skirts 32, 36 are arranged in a similar manner to one another, it is to be understood that in other versions of the apparatus 10 that one of the trailer skirts 32 could for instance be parallel to its side surface 26 while the other trailer skirt 36 is not parallel to its side surface 30.

Figure 3:
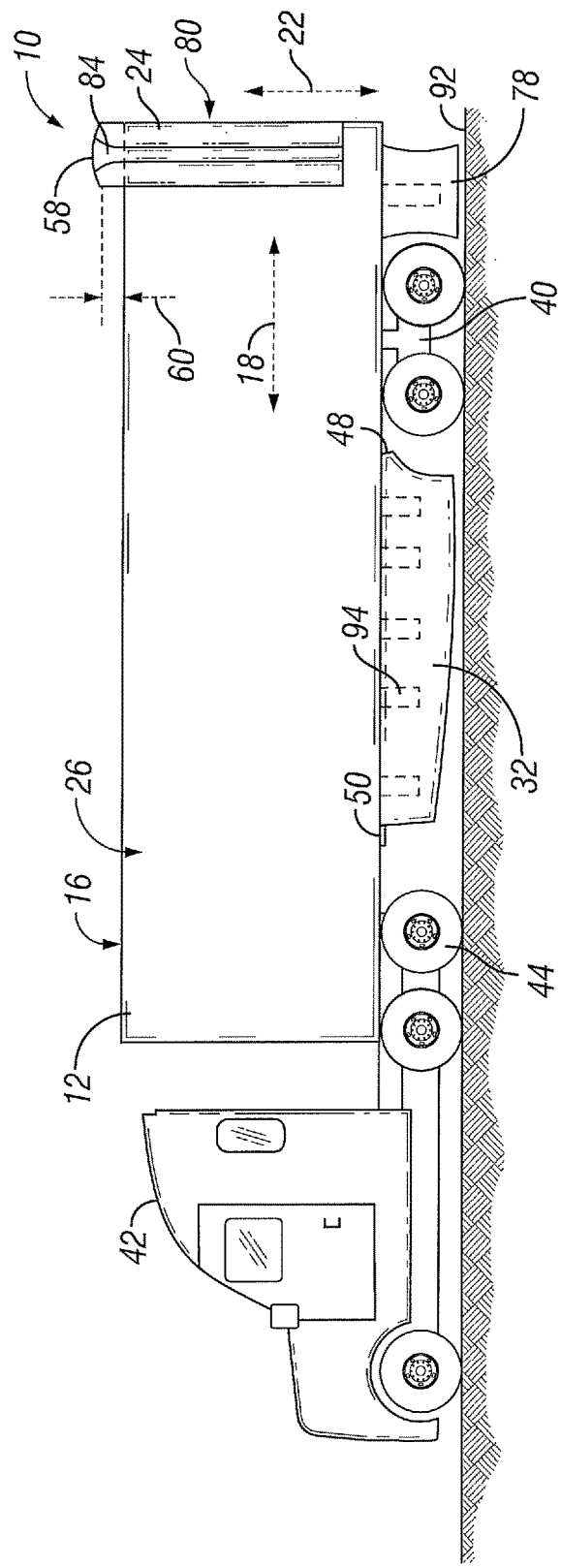
FIG. 3 is a side view of a tractor hauling a trailer that has an apparatus in accordance with another embodiment that features angled skirts.
Figure 4:
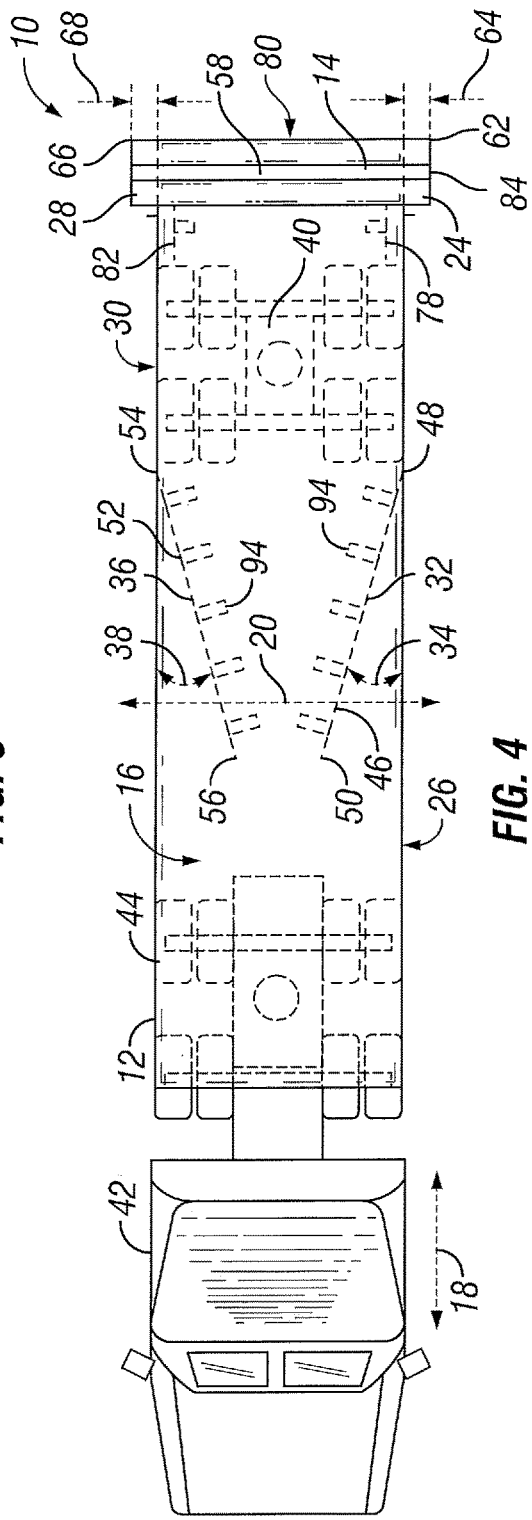
FIG. 4 is a top view of FIG. 3.

Another configuration of the trailer skirts 32, 36 are illustrated in FIGS. 3 and 4 in which a pair of skirts 32, 36 are again present and are located completely between the drive tires 44 and the bogie assembly 40 in the longitudinal direction 18. The panels making up the skirts 32, 36 are again flat along their entire lengths. The first trailer skirt 32 has a rearward most point 48 and a forward most point 50 with the first line 46 drawn between and connecting these points 48, 50 that matches the panel that directs airflow of the first trailer skirt 32. However, the first line 46 is not parallel to the line of the first side surface 26 as seen in the top view of FIG. 4. Instead, the first line 46 is oriented at an angle 34 to the first side surface 26. The angle 34 is 20 degrees. In other embodiments, the angle 34 may be from 0 degrees (parallel) up to and including 20 degrees. The angle 34 is measured in the direction of extension of the trailer skirt 32 forward in the longitudinal direction 18. The angle 34 is the angle of the panel of the first trailer skirt 32 that directs air to the first side surface 26 because this panel is the same as and overlaps the first line 46. As such, the first line 46 is measured in relation to the line created by the top view of the first side surface 26 and the angle 34 between these two lines is measured. Placement of the angle 34 in the 0-20 degree range allows for complimentary aerodynamic performance of the skirt 32 used in combinations with the side fairings 24, 28, 24, 28. In some embodiments, the forward most point 50 can sit from 0 to 20 inches inboard of the first side surface 26 in the lateral direction 20 towards the center of the trailer 12. The rearward most point 48 could sit from 0 to 8 inches inboard of the first side surface 26 in the lateral direction 20.

The second trailer skirt 36 has a second line 52 that is oriented at an angle 38 to the line of the second side surface 30 when viewed from the top in FIG. 4. This angle 38 is 20 degrees. In other embodiments, the angle 38 may be from 0 (parallel) to 20 degrees. The angle 38 can be the same as angle 34, or these angles 38, 34 can be different from one another in relation to the trailer 12 so that the skirts 32, 36 are not oriented at the same magnitude of angularity to their respective side surfaces 26, 30. The angle 38 is again measured by looking at the direction of extension of the second trailer skirt 36 forward in the longitudinal direction 18. The direction of extension of the second line 52 is noted upon moving forward in the longitudinal direction 18 from the rearward most point 54 to the forward most point 56. This second line 52 is compared to the line created by the second side surface 30 upon viewing it from above in FIG. 4 and the angle 38 is measured as the orientation between these two lines. The skirts 32, 36 are arranged so that they extend constantly inboard in the lateral direction 20 upon extension forward in the longitudinal direction 18. In this regard, at no point do the skirts 32, 36 extend outboard in the lateral direction 20, but instead only in the inboard direction as observed in the forward longitudinal direction 18. The forward most point 56 can sit from 0 to 20 inches inboard of the second side surface 30 in the lateral direction, and the rearward most point 54 may sit from 0 to 8 inches inboard of the second side surface 30.

Figure 5:
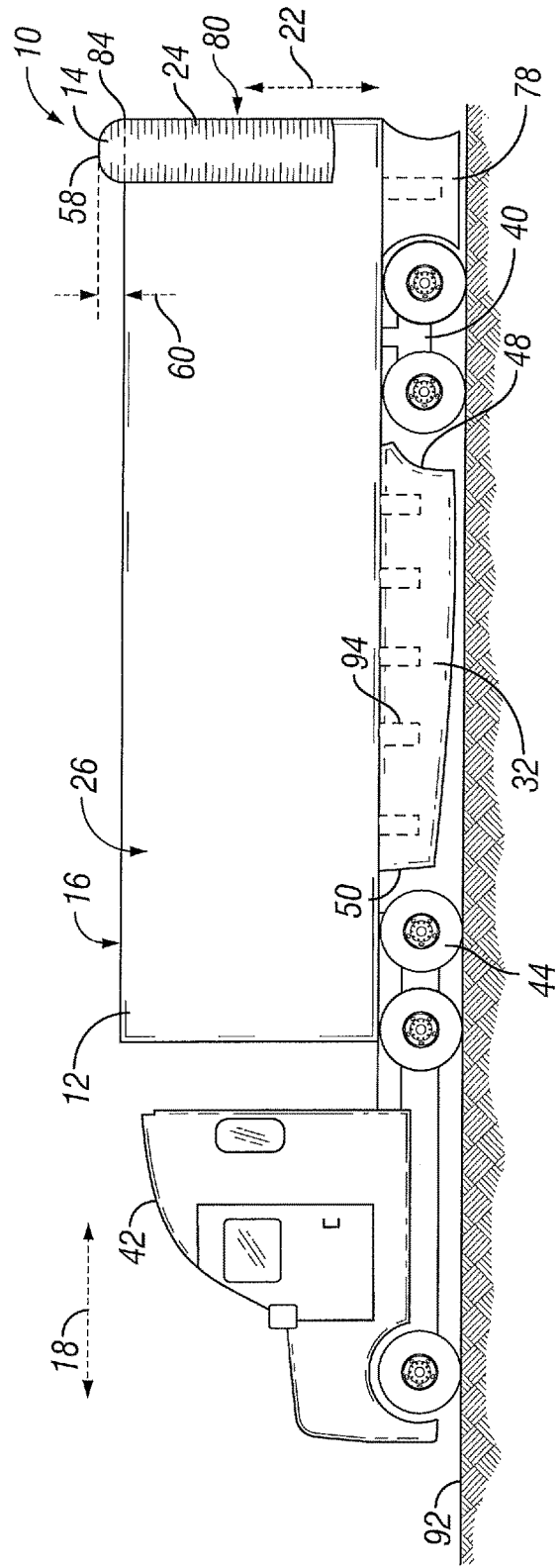
FIG. 5 is a side view of a tractor hauling a trailer that has an apparatus in accordance with another embodiment that features skirts with multiple angled sections.
Figure 6:
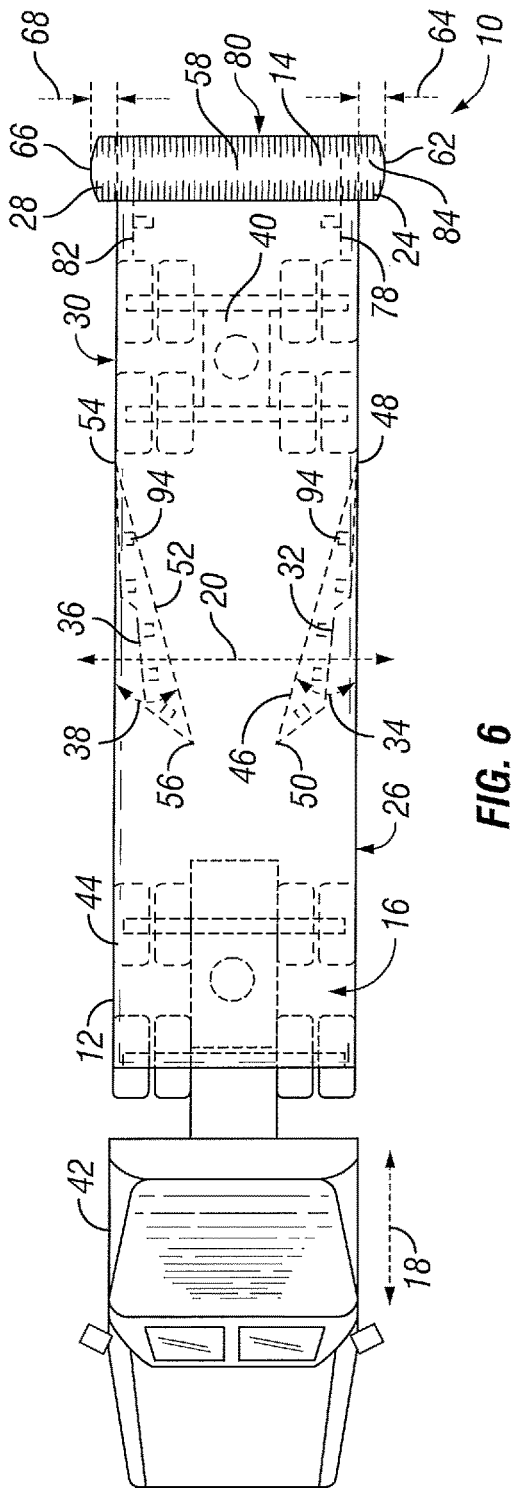
FIG. 6 is a top view of FIG. 5.

Another version of the first and second trailer skirts 32, 36 is shown in FIGS. 5 and 6. Unlike previous versions, the panels that make up the trailer skirts 32, 36 do not have flat surfaces across their entire lengths that direct the airflow. Instead, the skirts 32, 36 have sections that are oriented at different angles to one another and at different angles to the trailer 12. Although four such sections that change the angular orientation of the skirts 32, 36 are shown, fewer or more may be present. However, the panels that direct airflow still have a rearward most point 48, 54 and a forward most point 50, 56. The first and second lines 46, 52 are drawn through these points 48, 54, 50, 56 as previously discussed and the angles 34, 38 are calculated also as previously discussed. The panels making up the airflow surfaces of the skirts 32, 36 do not lie completely on these lines 46, 52 as in other embodiments but are for the most part out of sync with the lines 46, 52. A majority may be inboard of the lines 46, 52 in the lateral direction 20 in some embodiments, and in other embodiments a majority may be outboard of the lines 46, 52. As with other embodiments, the surfaces that direct airflow need not be flat, but could be curved and could have grooves or other features. The skirts 32, 36 could change their direction of orientation so that they are moving either inboard or outboard in the lateral direction 20 at different points. However, the lines 46, 52 still have a single angle 34, 38 for measurement even if localized portions of the skirts 32, 36 are oriented at different angles from one another and from that of the lines 46, 52.

Figure 8:
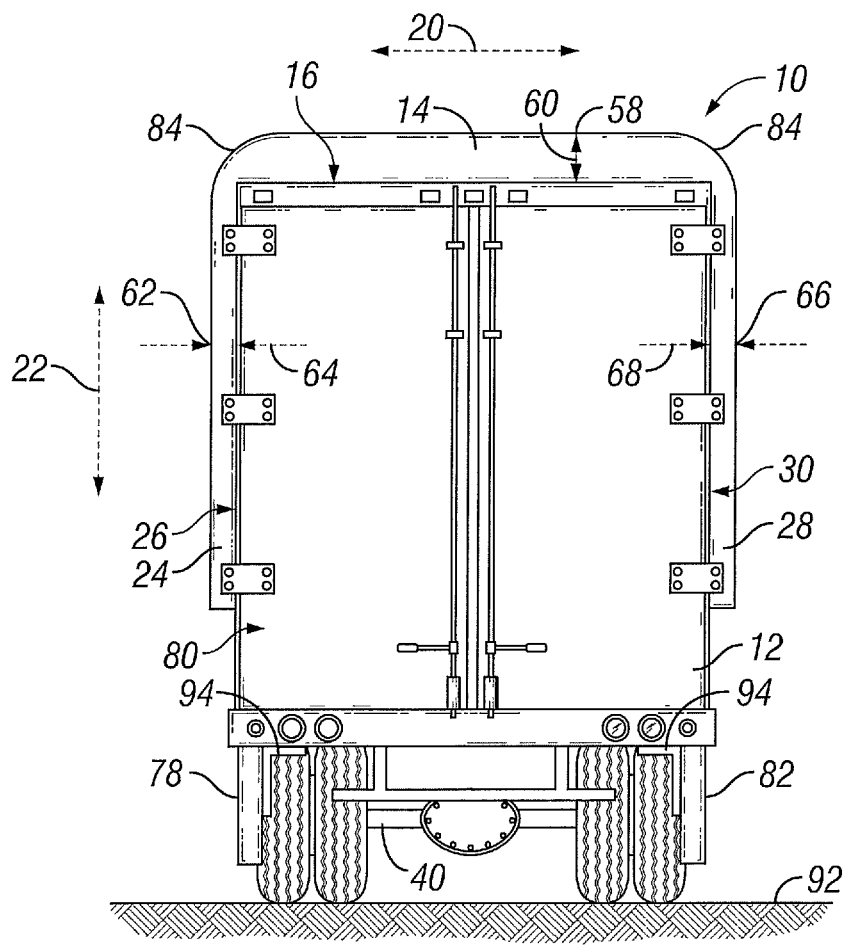
FIG. 8 is a back view of the apparatus mounted onto a trailer.

FIG. 8 shows a back view of the trailer 12 with attached apparatus 10. The top fairing 14 has an upper terminal point 58 that is the highest point of the top fairing 14 in the vertical direction 22. There may be a single upper terminal point 58 on the top fairing 14, or there may be multiple locations where the upper terminal point 58 is located. The height 60 of the top fairing 14 is measured from the top surface 16 of the trailer 12, at the same location at the upper terminal point 58 in the lateral direction 20, to the upper terminal point 58 in the vertical direction 22. The top surface 16 is a panel that covers the cargo area of the trailer. The top surface 16 near the back end 80 may have a rain gutter located thereon which would be an indentation on the top surface 16 that extends downward in the vertical direction 22. Other structural elements could be present at or on the top surface 16 near the back end. When describing the heights of the top fairings 14 and discussion of the associated top surfaces 16, it is to be understood that the heights are measured from the panel section of the top surface 16 and not from the rain gutters or other structural elements at or on the top surface 16. The side fairing 24 has an outer terminal point 62 located on its outer surface which is the portion of the side faring 24 farthest from the center of the trailer 12 in the lateral direction 20. There may be a single point on the outer surface of the side fairing 24 that is farthest and thus a single outer terminal point 62, or there may be multiple locations along the side fairing 24 that are farthest and thus a plurality of outer terminal points 62 are present. The width 64 of the side fairing 24 may be measured from the side surface 26, that is as the same vertical location as the outer terminal point 62 in the vertical direction 22, to the outer terminal point 62 in the lateral direction 20. The magnitude of the height 60 is greater than the magnitude of the width 64 in accordance with some exemplary embodiments. In a similar vein, the second side fairing 28 has a width 68 that is measured from the second side surface 30, that is at the same location in the vertical direction 22, to an outer terminal point 66 in the lateral direction 20. The outer terminal point 66 is the point of the outer surface of the second side fairing 28 that is farthest from the center of the trailer 12 in the lateral direction 20. The magnitude of the width 66 is less than the magnitude of the height 60 in accordance with some exemplary embodiments. In some instances, the magnitudes of the widths 64 and 68 are the same.

Figure 9:
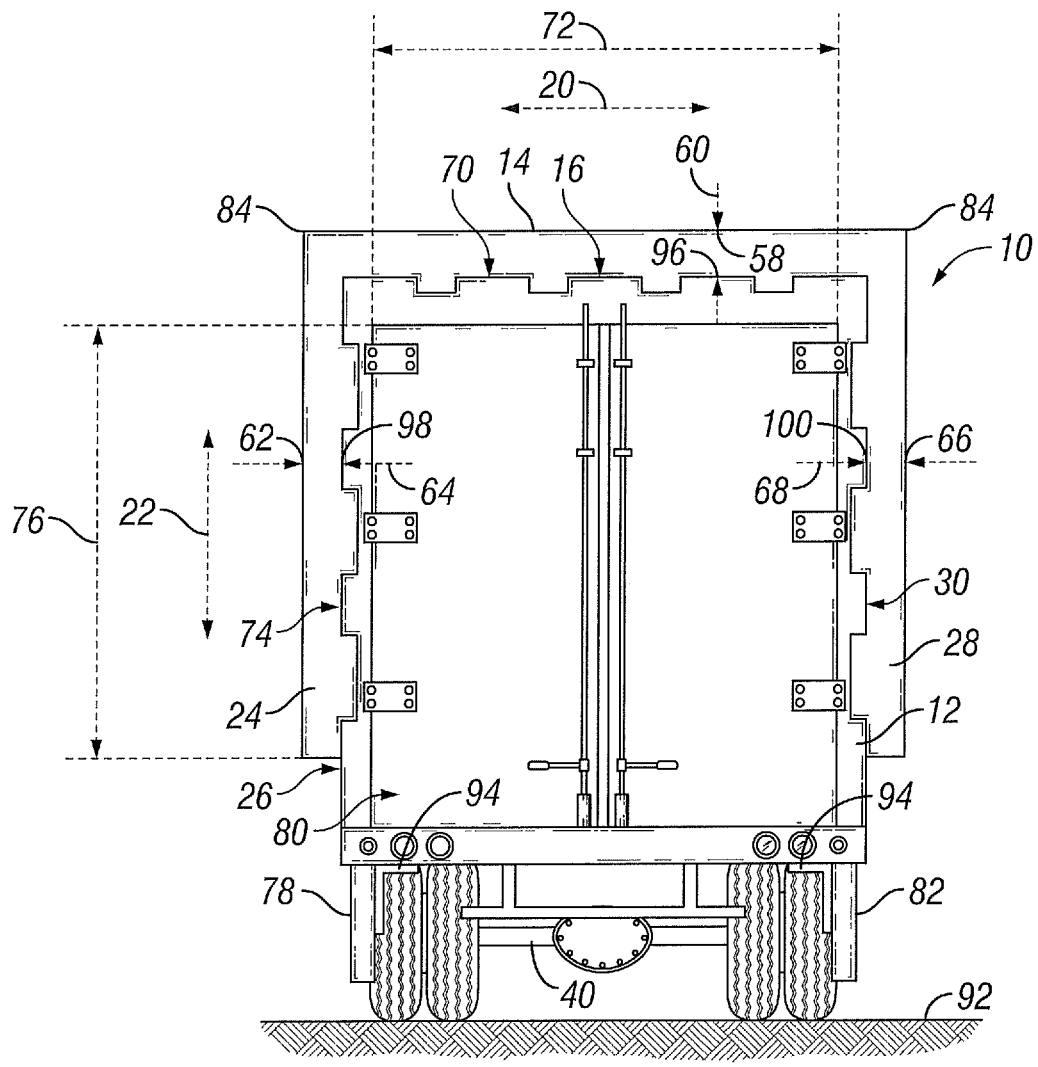
FIG. 9 is a back view of the apparatus mounted onto a trailer that has top and side surfaces that are not even in height or width.

FIG. 9 shows an alternate embodiment in which the trailer 12 does not have flat side surfaces 26, 30 or a flat top surface 16 at least at locations onto which the apparatus 10 is mounted. The surfaces 26, 30, 16 could be grooved or have different areas of height/width. The area 70 of the top surface 16 engaged or covered by the top fairing 14 has a width 72 that extends in the lateral direction 20. The top fairing 14 extends into the grooves present on the top surface 16 so as to fill them in, but in other arrangements the grooves could be completely or partially empty. A highest location 96 of the top surface 16 is the location of the top surface 16 that is highest in the vertical direction 22. There may be a single highest location 96, or there may be multiple highest locations 96 along the width 72 of the area 70. The height 60 is measured from the highest location 96 to the upper terminal point 58 of the outer surface of the fairing 14 in the vertical direction 22. The side fairing 24 can be arranged in a similar manner in which an area 74 of the first side surface 26 has different inboard and outboard locations in the lateral direction 20 along an entire height 76 of the area 74. The entire height 76 is the height in the vertical direction 22 that the side fairing 24 engages or covers when the apparatus 10 is attached. One or more locations of the side surface 26 can have a maximum outboard location 98 in the lateral direction 20, and a most outboard location 98 is located on these one or more points of the side surface 26. In FIG. 9, the most outboard location 98 also has the same positioning in the vertical direction 22. The width 64 is measured from the most outboard location 98 to the outer terminal point 62 in the lateral direction 20. The magnitude of the height 60 may be greater than the magnitude of the width 64.

Also, the second side faring 28 can have a second side surface 30 that is not flat but instead features grooves or other depressions cut therein. The second side fairing 28 may cover or be inserted into some or all of the grooves on the second side surface 30 and includes an outer terminal point 66 which is the point of the second side faring 28 that is farthest from the center of the trailer 12 in the lateral direction 20. There may be a single outer terminal point 66, or multiple locations of the second side fairing 28 may include an outer terminal point 66. In a similar manner, the second side surface 30 may have a single or a plurality of maximum outboard locations 100 which are the portions of the second side surface 30 farthest from the center of the trailer 12 in the lateral direction 20. The outer terminal point 66 and the maximum outboard location 100 are at the same height in the vertical direction 22. The width 66 is measured from the outer terminal point 66 to the maximum outboard location 100 in the lateral direction. The magnitude of the width 66 is less than the magnitude of the height 60. In some instances, the magnitude of the width 66 is the same as the magnitude of the width 64.

An additional feature of the apparatus 10 is shown with reference to FIGS. 1 and 2 in which a first trailer rear skirt 78 and a second trailer rear skirt 82 are present on the underside of the trailer 12. The rear skirts 78, 82 have panels that direct airflow to achieve a desired aerodynamic performance of the trailer 12 when driven. The rear skirts 78, 82 can work in combination with the first and second trailer skirts 32. The trailer rear skirts 78, 82 are located rearward of the first and second trailer skirts 32, 36 in the longitudinal direction 18 and in some instances may be located completely rearward of the bogie assembly 40 in the longitudinal direction 18. In some embodiments, there may be a gap of at least 2 meters between the rearward most points 48, 54 of the forward skirts 32, 36 and the forward most points of the first and second trailer rear skirts 78, 82 in the longitudinal direction 18. This gap between the forward skirts 32, 36 and the rearward skirts 78, 82 allow for access to the bogie assembly 40 tires and wheels and rear axle. The gap avoids interference with the bogie assembly 40, which can slide from a front location to a rear location in the longitudinal direction 18, when the bogie assembly is located in one of the forward locations and running to close to the back end 80.

In other instances, the trailer rear skirts 78, 82 are not completely behind the bogie assembly 40 but instead at least partially cover the bogie assembly 40 so that at least a portion of the bogie assembly 40 is located at the same position in the longitudinal direction 18 as portions of the first and second trailer rear skirts 32, 36. However, regardless of the positioning of the trailer rear skirts 78, 82 it may be the case that enough space is provided for accessing the bogie assembly 40 to allow for tire and wheel change when the bogie assembly 40 is located in the correct position. The bogie assembly 40 may be capable of sliding forward and rearward in the longitudinal direction 18 so this may effect relative placement between these components 40, 78 and 82 as well. Also, providing enough access to the bogie assembly 40 due to the presence of the when rear skirts 78, 82 may require one to take into account the positioning of the forward trailer skirts 32, 36 as well.

The trailer rear skirts 78, 82 may not extend to the back end 80 of the trailer 12 in the longitudinal direction 18. Instead, the trailer rear skirts 78, 82 can stop short of the back end 80 up to 0.5 meters from the back end 80 in the longitudinal direction so that a space no more than 0.5 meters exists from the back end 80 to the rearward longitudinal points of the first and second trailer rear skirts 78, 82 in the longitudinal direction 18. Of course, in other embodiments the trailer rear skirts 78, 82 can extend all the way to the back end 80 in the longitudinal direction 18 or to any extent short of or beyond the back end 80. The trailer rear skirts 78, 82 may be attached to the bottom of the trailer 12 via brackets 94 and can extend in the vertical direction 20 towards the ground 92 stopping short to allow sufficient clearance thereto. The embodiments in FIGS. 1-4 all have 2 trailer rear skirts 78, 82 but a single one of the trailer rear skirts 78 or 82 could be present in other embodiments. In still further versions, the first trailer rear skirt 78 is configured differently than the second trailer rear skirt 82. The panels that make up the trailer rear skirts 78, 82 could be configured in the same manners as previously discussed with respect to the forward trailer skirts 32, 36 (for example the air directing panels are parallel to the first and second side surfaces 26, 30) and a repeat of this information is not necessary. In some instances, there may be a small angle associated with the trailer rear skirts 32, 36. This small angle may be an inward displacement at the rear 1/3 of the trailer rear skirts 78, 82 in the longitudinal direction 18. The amount of the displacement can be less than 3 inches inboard in the lateral direction 20. In other embodiments, the rear 1/3 is displaced 4 inches inboard from the side surfaces 26, 30 in the lateral direction 20. With respect to lateral placement of the trailer rear skirts 78, 82, they may be positioned not more than 2 inches inside of their respective side surfaces 26, 30 in the lateral direction 20. In other embodiments, the panels of the trailer rear skirts 78, 82 or portions thereof sit outside of the side surfaces 26, 30 by up to 2 inches. In some embodiments, the trailer rear skirts 78, 82 are parallel allowing for variation in from the side surfaces 26, 30 by 2 inches for the front 2/3 of the skirts 78, 82 in the longitudinal direction 18, and 4 inches from the side surfaces 26, 30 at the back edges of the skirts 78, 82 in the longitudinal direction 18. The lower extent of the trailer 12 can be tapered up to reduce the changes of impact with the ground 92 caused by the departure angle.

With reference back to FIG. 9, the intersection of the top fairing 14 with the side fairings 24, 28 includes two sharp 90 degree corners 84 at their intersection. In some embodiments, the corner 84 can be rounded and configured to adjust aerodynamic performance. A rounded corner 84 may achieve desired aerodynamic performance in relation to cross-winds imparted onto the trailer 12 through normal, forward use of the trailer 12 in the longitudinal direction 18. This reduction in drag from cross-winds may increase the fuel efficiency of the tractor 42 trailer 12 vehicle. FIG. 8 shows the corners 84 at the fairing 14, 24, 28 intersections being rounded instead of having a sharp edge. Both corners 84 can be configured to have the same size, shape, and features, or they may be different in different embodiments, especially when the first side fairing 24 is not the same as the second side fairing 28. The corners 84 can be described as being portions of the side fairings 24 and 28, can be portions of the top fairing 14, can be portions of all of the fairings 14, 24, 28, or may be separate components from the fairings 14, 24 and 28. However, the corner 84 should be configured so that at least some portion of the intersection of the top fairing 14 and the side faring 24 (and 28 in some embodiments) is continuous. The entire intersection between the fairings 14, 24, 28 need not be continuous in other versions.

Figure 7:
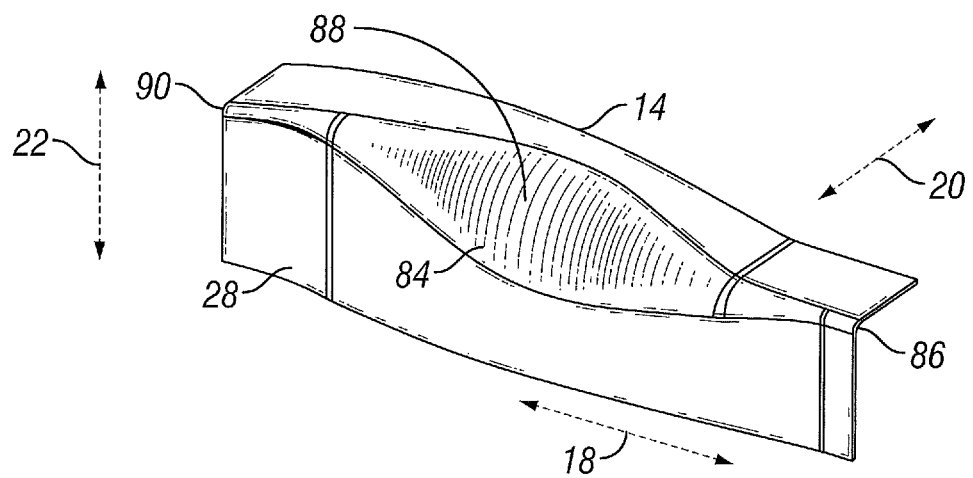
FIG. 7 is a perspective view of a corner of an engaging top and side fairing in accordance with another embodiment.

FIG. 7 is a perspective view of a corner 84 that is present on the right hand side of the trailer 12 and is at the intersection of the second side fairing 28 and the top fairing 14. The corner 84 of FIG. 7 could be the one shown in the FIG. 8 embodiment, or the one shown in other presently disclosed embodiments. The corner 84 at the left hand side of the trailer 12 which is at the intersection of the top fairing 14 and the first side fairing 24 could be made in a similar manner and a repeat of this information is not necessary. In FIG. 7, the leading section 86 of the corner 84 is located at the forward most point of the corner 84 in the longitudinal direction 18. The tailing section 90 of the corner 84 in the longitudinal direction 18 is located at the rearward most position of the corner 84. In between these sections 86, 90 the middle section 88 of the corner 84 is located in the longitudinal direction 18. The corner 84 has a convex outer surface at all points from the leading section 86 to the tailing section 90. However, in other embodiments some portion of the corner 84 need not be convex but could be flat, angled, or concave in shape. The shape of the corner 84 is driven by the size and shape of the meeting fairing 14, 28 surfaces that converge at the corner 84. The radius of curvature of the surface at the leading section 86 may be the same as the radius of curvature of the surface at the tailing section 90, and these two radii of curvature may each be less than the radius of curvature of the surface of the corner 84 at the middle section 88. In some instances, the radius of curvature at the leading section 86 is 0.2 inches, the radius of curvature at the middle section is 5.0 inches, and the radius of curvature at the tailing section 90 is 0.2 inches.

Figure 10:
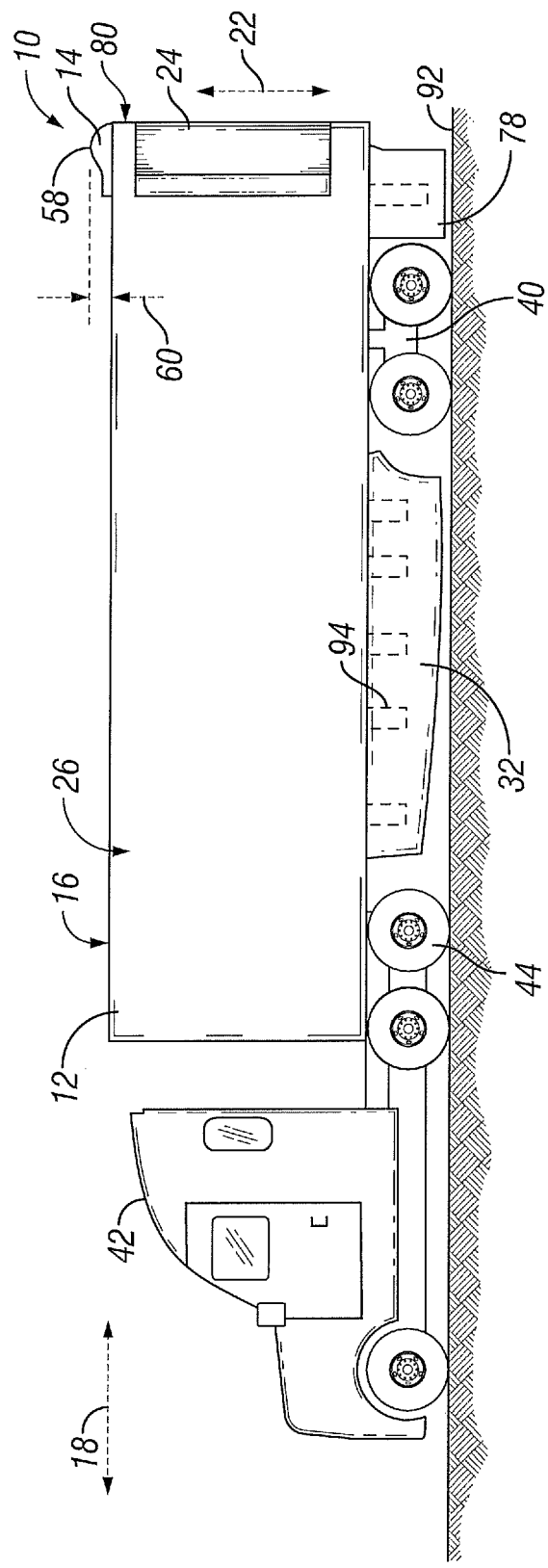
FIG. 10 is a side view of the apparatus mounted onto a trailer that has parallel front skirts.
Figure 11:
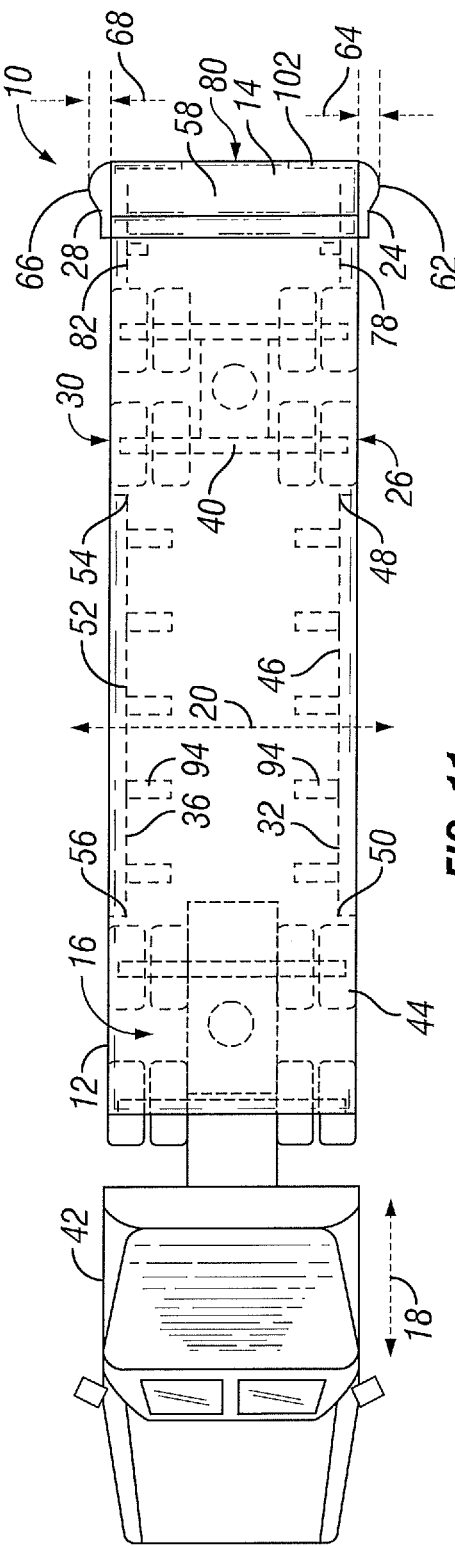
FIG. 11 top view of FIG. 10.

FIGS. 10 and 11 illustrate another embodiment of the apparatus 10. In this instance, the side fairings 24, 28 do not contact or otherwise engage the top fairing 14. The first side fairing 24 extends upwards along the majority of the height of the first side surface 26 but stops short of extending to the top surface 16 in the height direction 22 so that a gap exists between the side fairing 24 and the top fairing 14 causing these components not to engage one another. The second side fairing 28 is arranged in a similar manner in which it extends over a majority of the height of the second side surface 30 but not all the way up to the top surface 16 thus leaving a gap between the second side fairing 28 and the top fairing 14 causing these components not to engage one another. The apparatus 10 further includes the first and second trailer skirts 32, 36 and the first trailer rear skirt 78 and second trailer rear skirt 82.

Figure 12:
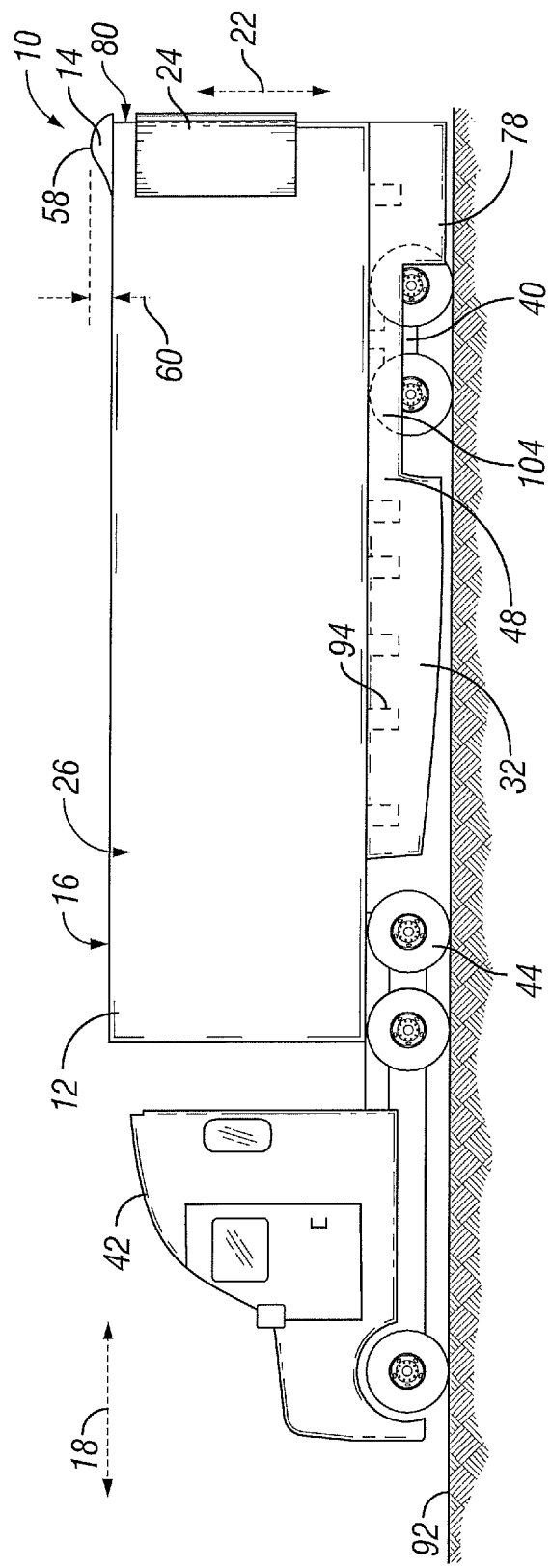
FIG. 12 is a side view of the apparatus mounted onto a trailer in which a connecting portion is present between the front and rear skirts.
Figure 13:
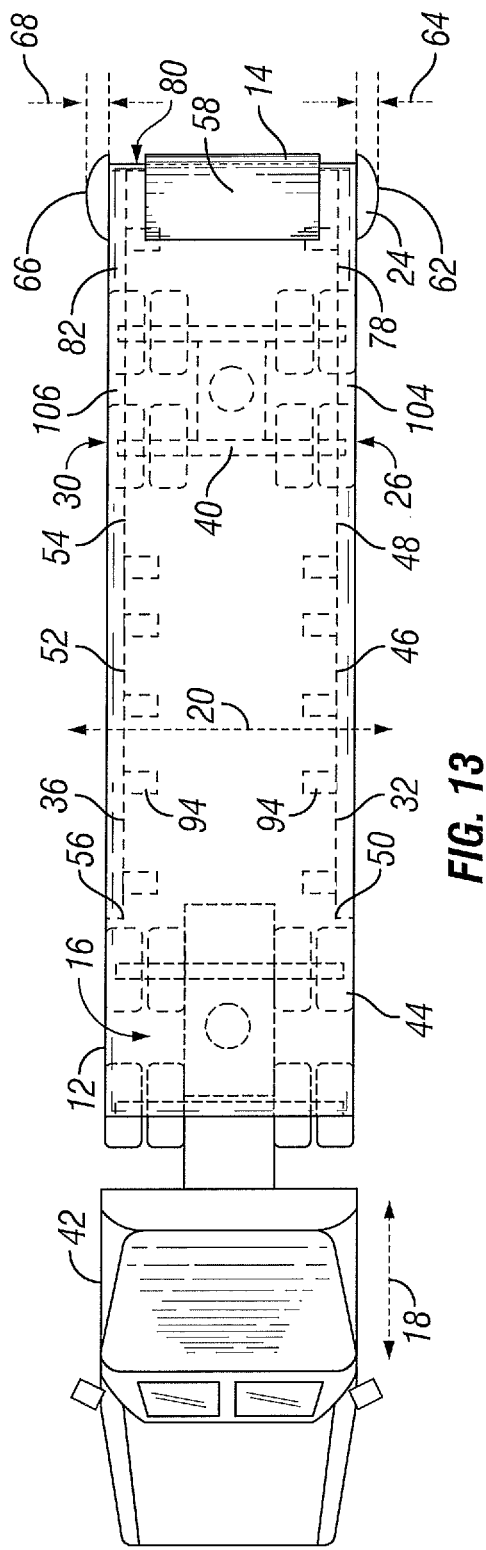
FIG. 13 is a top view of FIG. 12.

Another embodiment of the apparatus 10 is shown in FIGS. 12 and 13 in which the side fairings 24, 28 are again separate from and not contacting the top fairing 14. Further, the profile shapes of the fairings 14, 24, 28 are different in that the side fairings 24, 28 are more curved than other embodiments, and the top fairing 14 has a more straight angled upward extension to its upper terminal point 58 at which time it then assumes a curved, convex profile shape to its back end. Additionally, the fairings 14, 24, 28 do not terminate at the end of the trailer 12 in the longitudinal direction 18 but rather extend beyond the back end 80 so that they are all located rearward of the back end 18 in the longitudinal direction 18. The fairings 14, 24, 28 may each extend up to three inches rearward of the back end 80 in the longitudinal direction 18.

Additionally optimized savings are achieved with mudflaps 158 which have openings to allow air to flow through. These may be achieved with slots or holes in these mudflaps 158. These openings are configured to stop or reduce energy of projectiles passing which pass through them while still allowing air to pass through. These mudflaps 158 are attached to move with bogie assembly mounted behind rear most tires.

The preferred embodiment consists of a pair of front skirts 32, 36 longer than the rear skirts 78, 82, from 170" to 280" in length front to back and a distance of the ground between (distance between ground and bottom of the skirt of 5" and 15" and a pair of rear skirts 78, 82 from 60" to 100" in length front to back and a ground clearance of 10" to up to 25". With top 14 and side 24, 26 fairings with a peak thickness off the wall or top of 1" to 2" and a length front to back of 10" to 24" which extend less than 3" off the back of the trailer. Mudflaps 158 of a slotted or porous design could also be included and positioned behind the tires of the bogie assembly 40. This combination enables a stabilized wake structure behind the trailer 12 without requiring parts to move during normal operation of driving and loading trailers. In this preferred embodiment it was found that having rear skirts 78, 82 that do not taper in towards the center of the trailer 12 at all or less than 2" from the side of the trailer 12 is optimal.

The apparatus again includes front trailer skirts 32, 36 and trailer rear skirts 78, 82 but in this embodiment they are connected by connecting portions 104, 106. The first trailer skirt 32 extends rearward in the longitudinal direction 18 to a rearward most point 48 that is forward of the bogie assembly 40 in the longitudinal direction 18. The connecting portion 104 extends rearward from the rearward most point 48 and covers some but not all of the height of the bogie assembly 40. The first trailer rear skirt 78 extends from the very back end 80 of the trailer forward in the longitudinal direction 18 to the bogie assembly 40 and covers a portion of the rear tires of the bogie assembly 40 from view relative to the side view in FIG. 12. The connecting portion 104 extends between the first trailer rear skirt 78 and the first trailer skirt 32 and has a height that is not as tall as either of these skirts 78, 32 in the vertical direction 22. Although some of the bogie assembly 40 is covered not all of the bogie assembly 40 is covered by the skirting thus allowing it to be accessed for tire or wheel repair. The components 32, 104 and 78 are all parallel to the first side surface 26 and form a single piece extending along the bottom of the trailer 12. These parts may in fact be one piece, or can be made of multiple pieces. The connecting portion 106, second trailer skirt 36 and the second trailer rear skirt 82 can be configured in manners just described with respect to their counterparts 32, 104, 78 on the opposite side of the trailer 12 and a repeat of this information is not necessary.

The connecting portions 104, 106 are not as tall as the skirts 32, 36, 78, 82 in the vertical direction 22. The connecting portions 104, 106 can make up a greater than 2 meter notch, as measured in the longitudinal direction 18, that allows for access to the tires and wheels of the bogie assembly 40. The connecting portions 104, 106 should only be able to extend downward to the middle of the center of the wheels in the vertical direction 22 to allow for bolts to be removed. Although a good portion of the tires are shown as covered in the figures, in other embodiments the connecting portions 104, 106 extend downward only so that the upper 2 inches of the tires of the bogie assembly 40 are covered. In accordance with certain embodiments, the connecting portions 104, 106 are located from 1 inch below the trailer side surfaces 26, 30 to 2 inches below the upper extent of the tires of the bogie assembly 40.

Figure 14:
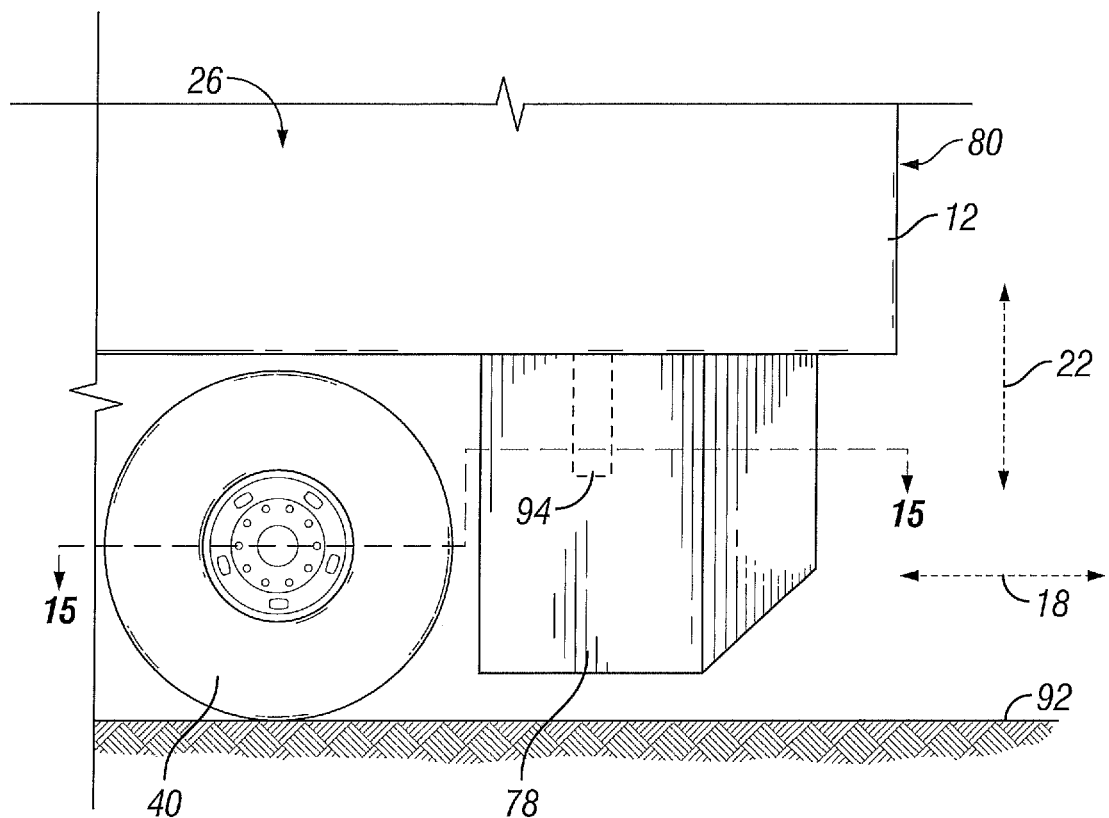
FIG. 14 is a side view of the trailer rear skirt mounted onto a trailer in which only a portion of the trailer is shown.
Figure 15:
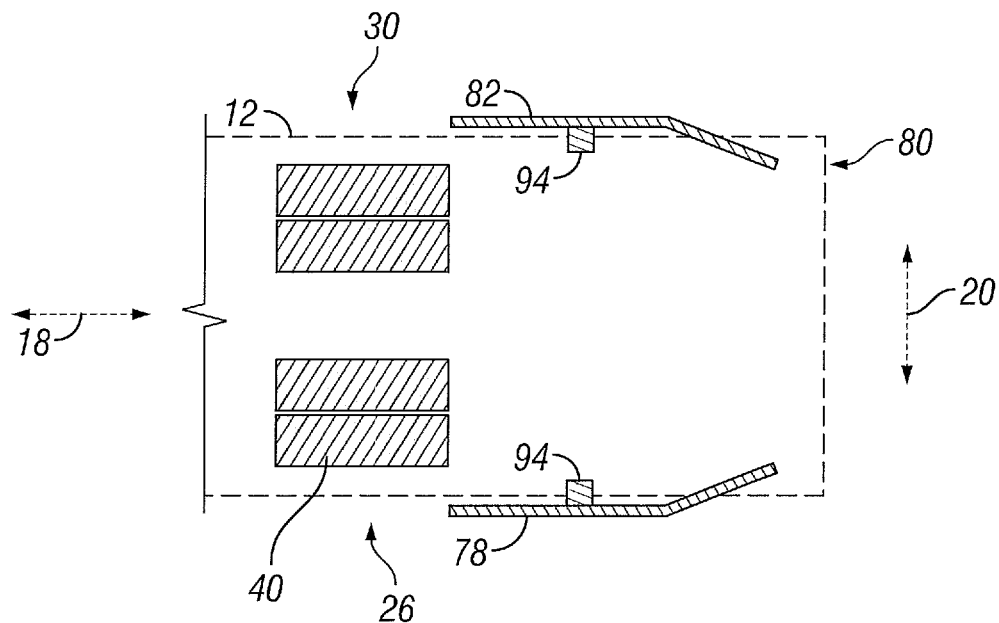
FIG. 15 is a top cross-sectional view taken along line 15-15 of FIG. 14 in which the perimeter of the trailer is also noted on the drawing for reference

FIGS. 14 and 15 show the rear section of the trailer 12 with emphasis on the first and second trailer rear skirts 78, 82. The skirts 78, 82 can be arranged so that the bogie assembly 40 is able to slide past. The skirts 78, 82 can have a front section in the lateral direction 18 that can have a narrow support profile to allow access for the bogie assembly 40. In this regard, they front sections of the skirts 78, 82 may not sit more than two inches inboard of the side surfaces 26, 30 in the lateral direction 20. The skirts 78, 82 may sit up to two inches outboard of the side surfaces 26, 30 in the lateral direction. The brackets 94 may be bifurcating brackets to allow for narrow support. Bifurcating brackets are those that reduce their bending stiffness after a threshold force or displacement is reached. The front sections of the skirts 78, 82, and in other instances the entire skirts 78, 82, can be parallel with their respective side surfaces 26, 30. The skirts 78, 82 can be variously positioned on the trailer such that the front section of the skirts 78, 82 that are the first ⅔ length of the skirts 78, 82 in the longitudinal direction 18 can be inboard of their respective side surfaces 26, 30 by up to two inches, and so that the rearward ⅓ of the skirts 78, 82 in the longitudinal direction 18 can be inboard up to four inches from their respective side surfaces 26, 30. In the FIGS. 14 and 15 embodiments, the front ⅔ of the skirts 78, 82 are located outboard of their respective side surfaces 26, 30, and the rearward ⅓ of the skirts 78, 82 extend inboard in the lateral direction 20 until they terminate at their rearward ends inboard of the side surfaces 26, 30 in the lateral direction 20. The front ⅔ of the skirts 78, 82 are parallel to the side surfaces 26, 30, and the back ⅓ section of the skirts 78, 82 are angled to the side surfaces 26, 30. It is to be understood that other embodiments have the entire rear skirts 78, 82 parallel to the side surfaces 26, 30 and the back ⅓ of these skirts 78, 82 are not angled inward or outward in the lateral direction 20. In the preferred embodiment, the rear skirts 78, 82 are parallel because converging back skirts 78, 82 result in increasing the energy of air flow entering the wake behind the trailer 12.

The back sections of the skirts 78, 82 are tapered so as to reduce chances of the skirts 78, 82 impacting the ground 92 caused by the departure angle. FIG. 14 shows the back ⅓ section of the skirts 78, 82 angled upwards in the vertical direction 22 from the bottom edge of the forward ⅔ sections so that contact with the ground 92 is less likely.

The apparatus 10 may thus include the top fairing 14, side fairings 24 and 28, both of the forward trailer skirts 32, 36, and both of the trailer rear skirts 78, 82. The components of the apparatus 10 can be made so that they do not have any moving parts during standard, forward driving use of the trailer 12. The apparatus 10 may lack any parts that fold or flex during standard use. The apparatus 10 can be constructed so that it does not interfere with opening of the door at the back end 80. The apparatus 10 may improve fuel savings of the trailer 12 when used. The apparatus 10 can be arranged so that the tires of the bogie assembly 40 are not always covered and are observable due to a break in skirting in the longitudinal direction 18.

Testing of the apparatus 10 has been conducted in which the disclosed system exhibited an improvement in aerodynamic performance from an industry leading boat tail and skirt solution. Further, testing of the apparatus 10 has unexpectedly discovered that the coefficient of drag decreased from 0.49 to 0.395 at 65 miles per hour with 4.5 degrees of yaw (19.4%). This is a surprising result because a full length skirt even covering the wheels resulted in a 9.6% reduction in drag and end fairings 14, 24, 28 typically result in a 4%-6% drag reduction. Thus even with the added drag of the gap present between the front skirts 32, 36 and the trailer rear back skirts 78, 82 the combination gains about a 5% drag improvement from this combination. One would expect the present design with the gap to perform worse than the full length skirt, but it does better. Further, the increase in performance is higher than the addition of full length skirt coverage 9.6% plus fairings 4%-6% (13.6%-15%) thus demonstrating that the apparatus 10 functions as a system in that the components achieve together in synergistic combination with one another a better performance than the sum of the individual components themselves. Further greater than additive results, these results have been confirmed with computational fluid dynamics, full scale drag measurements utilizing torque measurements, and fuel economy testing utilizing fuel flow meters.

FIGS. 16 and 17 illustrate a truck 42 transporting a trailer 12 that features back of the trailer fairings 24, 28 in accordance with another exemplary embodiment. The truck 42 and trailer 12 combination extends in a longitudinal direction 18 of the trailer 12 which is the general direction of travel as the tractor 42 pulls the trailer 12 forward. The side fairings 24, 28 direct airflow in an optimal manner around the back of the trailer 12 so that drag on the trailer 12 during travel is optimally reduced. The geometric design of the side fairings 24, 28 includes features that result in this optimal reduction of drag. The side fairings 24, 28 are located proximate to the back end 80 of the trailer 12 and are attached to the trailer 12 and are forward of the back end 80 in the longitudinal direction 18. In some instances the side fairings 24, 28 extend rearward of the back end 80 in the longitudinal direction 18. The side fairings 24, 28 are located at the back end of the trailer 12 because they are designed to effect the flow of air at the back end of the trailer 12 and behind the trailer 12 during travel. The first and second trailer skirts 32, 36 and first and second rear skirts 78, 82 are also present on the trailer 12.

As shown in FIG. 16, the side fairing 24, 28 extends in a vertical direction 22 of the trailer 12 along some, but not all, of the vertical height of the trailer 12. The side fairing 24, 28 is located closer to the top surface 16 of the trailer 12 than a bottom surface of the trailer 12. The side fairing 24, 28 may be located at the top surface 16, or it may be spaced some distance from the top surface 16 in the vertical direction 22. The side fairing 24, 28 is mounted to the side surface 26 of the trailer 12. In some instances, the side surface 26 can include grooves 108 that extend in the horizontal direction/longitudinal direction 18. The side fairing 24, 28 may be provided with ribs 110 that are disposed within these grooves 108 in order to allow the side fairing 24, 28 to fit on the side surface 26.

With reference to FIG. 17, the top faring 68 is likewise located at the back end of the trailer 12 so that it is closer to the back end 80 of the trailer 12 than to the front terminal end of the trailer 12. The top fairing 14 may be spaced some amount forward of the back end 80 in the longitudinal direction 18, may terminate right at the back end 80, or may extend rearward from the back end 80 in the longitudinal direction 18. The top fairing 14 may extend all the way across the top surface 16 in the lateral direction 20 of the trailer 12 so as to be located at both the right and left side surfaces 26, 30. Alternatively, the top fairing 14 may be spaced inboard from one or both of the side surfaces 26, 30. The right and left side fairings 24, 28 can be identical in configuration to one another, or may have different geographical shapes or include different members, such as mounting members.

Figure 18:
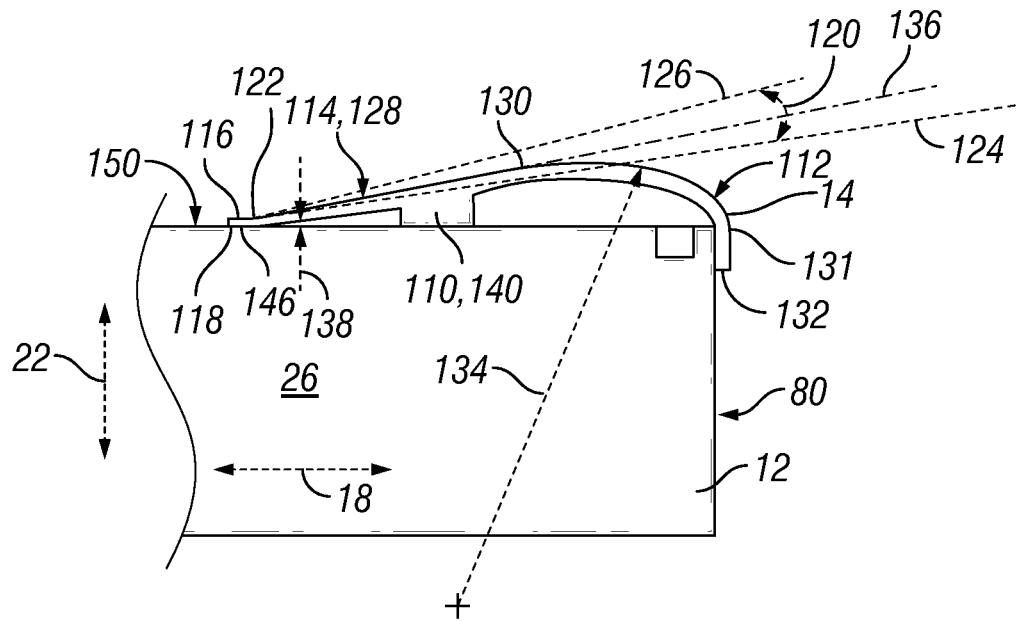
FIG. 18 is a side view of a back portion of a trailer with a top fairing.

FIG. 18 is a side view of the back end of the trailer 12 with the top fairing 14 positioned onto the top surface 16 of the trailer 12. The top fairing 14 has a leading airflow surface 114 that is forward of a tailing airflow surface 112 in the longitudinal direction 18. The top fairing 14 may be made of a single component or any number of components. The leading airflow surface 114 and the tailing airflow surface 112 may be just the surfaces of one or more portions of the top fairing 14, or may include in addition to the surfaces some thickness or portion or the rest of the top fairing 14. As such, it is to be understood that as used herein that the leading airflow surface 114 and the tailing airflow surface 112 includes the surface of some of the fairing 10, concerning both the top fairing 14 and the side fairing 24, 28, and may include some thickness or other portion of the fairing 10 in addition to the surface. It is to be understood that as used herein, when discussing the orientation of the surfaces 112, 114 with respect to angles, radii, locations, ranges, etc. the portion of the surfaces 112, 114 that are being measured or discussed are the outer surfaces of the leading airflow surface 114 and the tailing airflow surface 112 and not interior portions, if any, of these surfaces 112, 114. The surfaces 112, 114 can be made of plastic and may be formed through a thermal plastic forming process.

The leading airflow surface 114 has a leading edge 116 that is the forward most portion of the leading airflow surface 114 in the longitudinal direction 18. Forward of the leading edge 116 is an anchoring flange 118, but in other embodiments, for example as shown in the FIG. 19 embodiment, the leading edge 116 is the forward most portion of the entire top fairing 14. The leading airflow surface 114 can be oriented within an angular range 120 that is from 8-14 degrees. The angular range 120 is oriented rearward in the longitudinal direction 18. The angular range 120 includes a vertex 122 that is located at the leading edge 116. An arm 124 extends from the vertex 122 rearward in the longitudinal direction 18, and another arm 126 likewise extends from the vertex 122 rearward in the longitudinal direction 18 so that the arms 124, 126 and the vertex 122 bound the angular range 120. The angle of the angular range 120 is measured relative to the top surface 16. In this regard, an angle of 0 degrees is parallel to the top surface 16, and an angle of the angular range 120 that is 180 degrees is normal to the top surface 16.

The leading airflow surface 114 is positioned so that all of it is located within the angular range 120. In this regard, the angular range 120 is from 8 degrees to 14 degrees so that it is from 8 degrees to 14 degrees angled with respect to the top surface 16. The preferred orientation of the leading airflow surface 114 is from 11 degrees to 13 degrees. In the embodiment shown, the leading airflow surface 114 is 12 degrees. The leading airflow surface 114 is a flat surface that lies in a plane 128. It is therefore the case that the angular orientation of the leading airflow surface 114 does not change along its entire length in the longitudinal direction 18, and the entire leading airflow surface 114 is located within the angular range 120.

The leading airflow surface 114 ends at a meeting location 130 where it meets the tailing airflow surface 112. The tailing airflow surface 112 need not be completely located within the angular range 120. The tailing airflow surface 112 may be partially located within the angular range 120. The tailing airflow surface 112 is a curved surface that extends from the meeting location 130 to a tailing airflow surface terminal end 131. A flange of the top fairing 14 extends from the tailing airflow surface terminal end 131 to a terminal tailing end 132. The tailing airflow surface terminal end 131 is at the back end 80 or is forward of the back end 80 in the longitudinal direction 18. In other instances, the tailing airflow surface 112 extends to a terminal tailing end 132 of the top fairing 14 and a flange as previously mentioned is not present. In the embodiment shown, the tailing airflow surface 112 is curved at a set amount so that the entire tailing airflow surface 112 has but a single radius 134. The radius 134 is in the range from 500 millimeters to 900 millimeters. In more preferred embodiments, the radius 134 is from 800 millimeters to 900 millimeters.

The leading airflow surface 114 and the tailing airflow surface 112 are oriented with respect to one another so that they share a common tangent line 136. The common tangent line 136 lies in the plane 128 that the flat leading airflow surface 114 also lies. The common tangent line 136 is also a tangent line to the tailing airflow surface 112 at the meeting location 130. It is therefore the case that the leading airflow surface 114 and the tailing airflow surface 112 both share a common tangent line 136 at the meeting location 130 between the leading airflow surface 114 and the tailing airflow surface 112. The meeting location 130 is the point of engagement between the leading airflow surface 114 and the tailing airflow surface 112 and in so far as the common tangent line 136 is common to both of these surfaces 112, 114 it is to be understood that both the leading airflow surface 114 and the tailing airflow surface 112 simultaneously exist at the meeting location 130. In this regard, since both surfaces 112, 114 exist at the meeting location 130, the common tangent line 136 is common to both the leading airflow surface 114 and the tailing airflow surface 112 so that these two surfaces 112, 114 share a common tangent line 136 at this meeting location 130. This arrangement affords airflow off of the leading airflow surface 114 to channel against the tailing airflow surface 112 with no disruption. The orientation of the leading airflow surface 114, and the size of the radius 134 and the common tangent line 136 results in a geometry of the top fairing 14 that causes air flow to travel over the top fairing 14 and around the rear of the trailer 12 to reduce dragging force while the tractor 42 is hauling the trailer 12 to improve its fuel efficiency.

The leading air flow surface 114 is spaced from the top surface 16 so that a gap 138 is present and the portions of the top fairing 14 that are below or carry the leading air flow surface 114 are not in engagement with the top surface 16. The anchoring flange 118 is attached to the top surface 16 and may engage the top surface 16. The top fairing 14 has a frame 140 engages the top surface 16 and can be present to help reinforce the portions of the top fairing 14 that include the leading airflow surface 114 and the tailing airflow surface 112. The frame 140 is located below the leading air flow surface 114 in the vertical direction 22 and is not located below the tailing airflow surface 112. The frame 140 can be a separate component from the leading air flow surface 114 or may be simply a lower section of the leading air flow surface 114 and integrally formed with the leading air flow surface 114. The tailing airflow surface 112 is spaced from the top surface 16 from the meeting location 130 to the tailing airflow surface terminal end 131 at which point it may engage the top surface 16. The tailing air flow surface 112 could cover a rain gutter of the top surface 16 and does not extend beyond the back end 80 of the trailer 12.

It is to be understood that the frame 140 can be a component that is separate from the leading airflow surface 114 and the tailing airflow surface 112, or may be integrally formed with these surfaces 112, 114 and made of the same or different material than the surfaces 112, 114. The frame 140 may extend across and engage both of the surfaces 112, 114. If the surfaces 112, 114 include thickness and not just the outer surfaces that are measured, the frame 140 may still be present and the frame 140 could be part of these thicknesses even if the frame 140 is integrally formed with the surfaces 112, 114.

Figure 19:
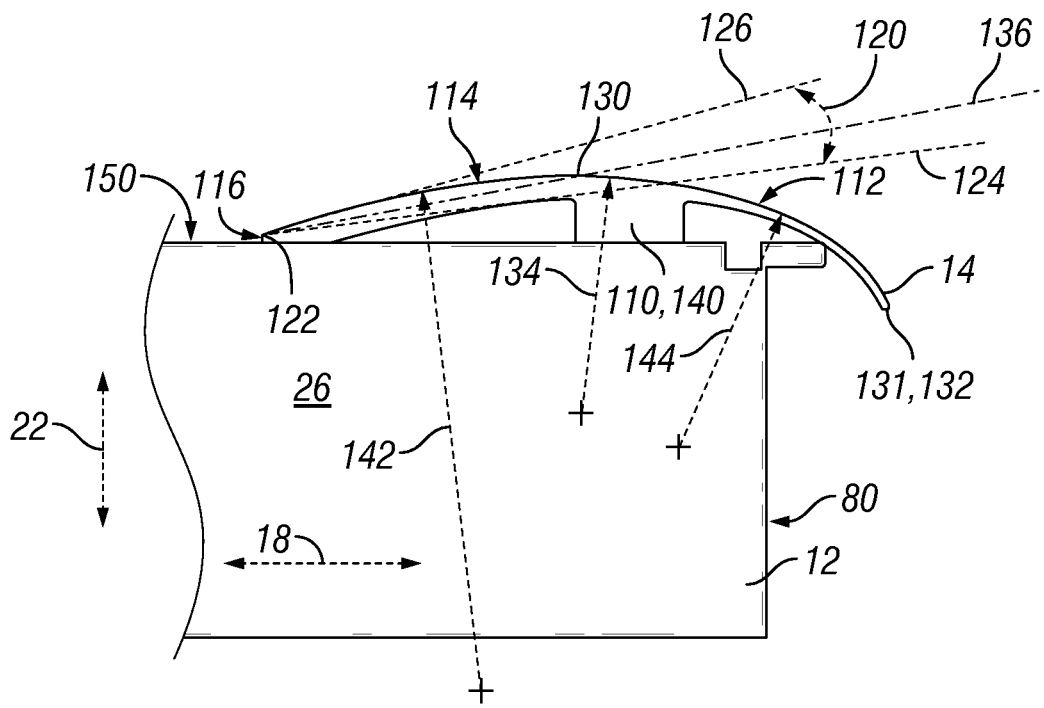
FIG. 19 is a side view of a back portion of a trailer with a top fairing in accordance with a different exemplary embodiment.

Another embodiment of the top fairing 14 is shown with reference to FIG. 19. The leading airflow surface 114 is different in that it is not a flat surface in a single plane 128, but is instead a curved surface. The flat leading airflow surface 114 is replaced by a curved surface with a leading airflow surface radius 142. The leading airflow surface radius 142 is larger than 2000 millimeters. Although curved, the leading airflow surface 114 is completely located within the angular range 120, that as previously stated is from 8 degrees to 14 degrees. The tailing airflow surface 112 is not a single curved surface with a single radius 134, but is instead a pair of curved surfaces in which each have their own radius. The first curved surface has a radius 134, and the second curved surface of the tailing airflow surface 112 has a different radius 144. Although a pair of curved surfaces are present, all of the radii of the curved surface of the tailing airflow surface 112 are each in the range of 500 millimeters to 900 millimeters. If multiple additional curved surfaces are present in the tailing airflow surface 112, their radii will likewise be in the range from 500 millimeters to 900 millimeters.

The meeting location 130 occurs between the leading airflow surface 114 and the curved surface of the tailing airflow surface 112 that has the radius 134. The leading airflow surface 114 and the tailing airflow surface 112 are both curved and share a common tangent line 136 at the meeting location 130. The vertex 122 is located at the terminal end that is the forward most location of the top fairing 14. The leading airflow surface 114 engages the top surface 16. The top fairing 14 also includes a frame 140 that is rearward of the meeting location 130 in the longitudinal direction 18 and is located only under the tailing airflow surface 112. The frame 140 can be arranged as previously discussed and a repeat of this information is not necessary. The tailing airflow surface 112 contacts the back end 80 and extends beyond the back end 80 and is rearward of the trailer 12 in the longitudinal direction 18. In other embodiments, the tailing airflow surface 112 may not engage the back end 80. The various elements of the top fairing 14 can be modified or arranged in the manners previously discussed with reference to the top fairing 14 in FIG. 18 and a repeat of this information is not necessary. The top fairing 14 with the modifications noted in FIG. 4 allows for airflow to be directed over the trailer 12 to reduce drag and increase aerodynamic performance.

Figure 20:
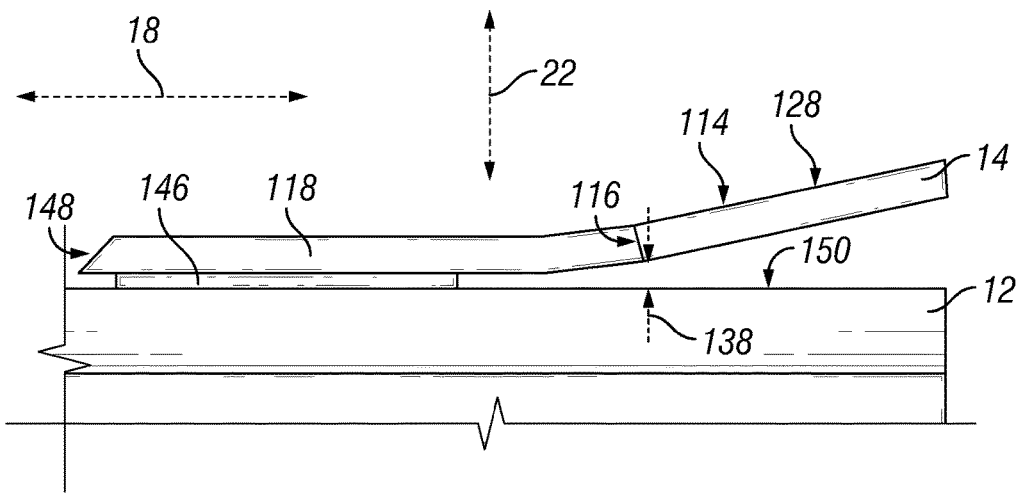
FIG. 20 is a detailed side view of the front portion of the top fairing showing the anchoring flange attached to the trailer via double sided tape.

FIG. 20 is a detailed view of the front portion of the top fairing 14 in accordance with certain exemplary embodiments. The top fairing 14 has an anchoring flange 118 that is attached to the top surface 16 with double sided tape 146 that engages the bottom of the anchoring flange 118 and the top surface 16. The double sided tape 146 extends in the longitudinal direction 18 an amount that is less than the length of the anchoring flange 118 in the longitudinal direction 18. The double sided tape 146 can be spaced rearward from the forward most leading edge of the anchoring flange 118 in the longitudinal direction 18 so that a space is present under the anchoring flange 118 forward of the double sided tape 146 in the longitudinal direction 18. The anchoring flange 118 has a chamfer 148 located at is forward most end in the longitudinal direction 18 that functions to reduce the profile of the anchoring flange 118 and direct air flow over the anchoring flange 118 in a more streamlined fashion. The chamfer 148 may be provided at an angle that is in the range from 15 degrees to 60 degrees. The chamfer 148 may be formed by machining the end of the anchoring flange 118. The leading airflow surface 114 engages anchoring flange 118 at the leading edge 116. The double sided tape 146 spaces the leading airflow surface 114 from the upper surface 150 so that a gap 138 exists between the upper surface 150 and the leading edge 116. The gap 138 is a space at this location in which the leading edge 116 does not engage the upper surface 150. The entire leading airflow surface 114 can likewise be spaced from and free from engagement with the upper surface 150 along its length, or just a portion of the leading airflow surface 114 can be free from engagement with the upper surface 150 extending rearward from the leading edge 116 in the longitudinal direction 18. The entire anchoring flange 118 is free from engagement with the top surface 16, but it may engage the top surface 16 in certain exemplary embodiments. The double sided tape 146 secures the anchoring flange 118 to the top surface 16 and may be between the anchoring flange 118 and the top surface 16 to prevent their engagement.

Figure 21:
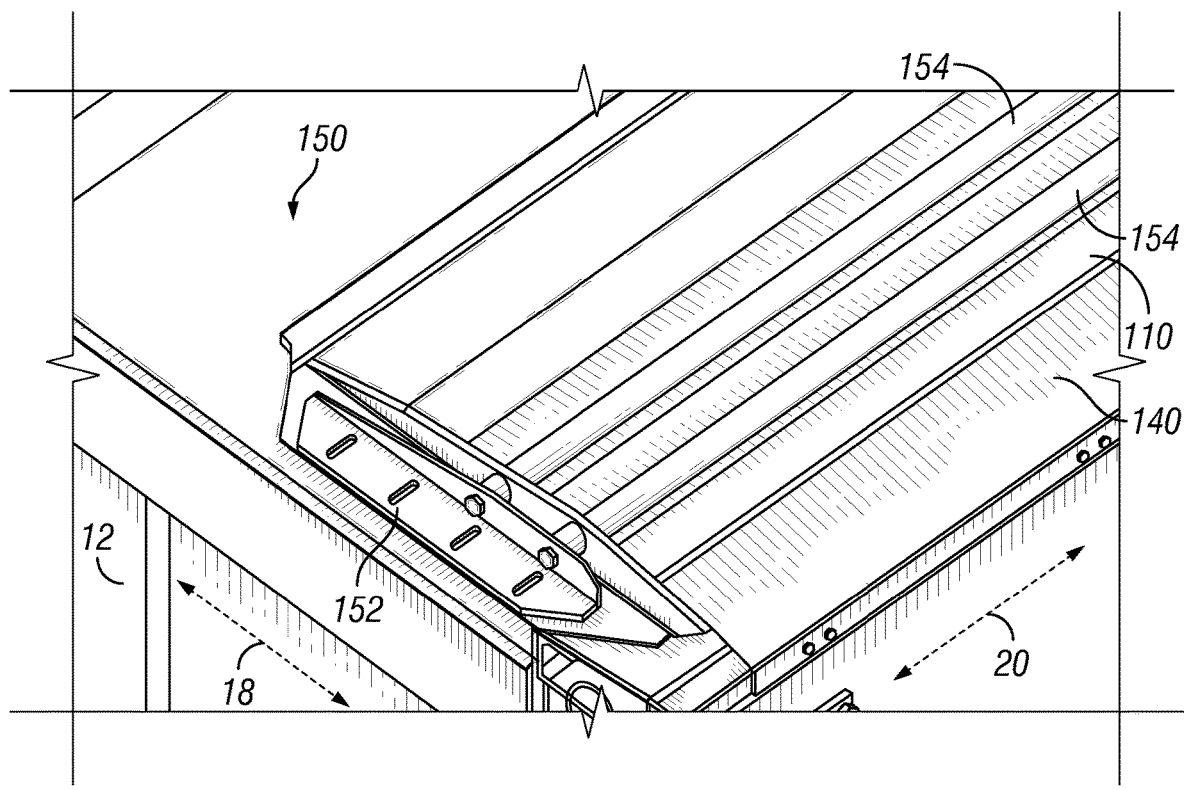
FIG. 21 is a perspective view of a back portion of the trailer with a frame of the fairing attached to the top surface of the trailer.

The frame 140 is shown attached to the top surface 16 with reference to FIG. 21. The trailer 12 includes brackets 152 at the top of the trailer 12 on opposite sides in the lateral direction 20. The frame 140 may be located under the bracket 152 so as to be between the bracket 152 and the top surface 16. One or more bars 154 extend between and to both of the brackets 152 in the lateral direction 20. The bars 154 may go through holes of the frame 140 to secure the frame 140 to the top surface 16, or may be positioned on top of or otherwise engage the frame 140 to secure the frame 140 to the top surface 16. The use of bars 154 may allow the frame 140, and consequently the leading airflow surface 114 and the tailing airflow surface 112 to be attached to the trailer 12 without having to drill holes through the top surface 16 which could results in rain or contaminants entering the interior of the trailer 12. In this manner, the interior of the trailer 12 is made more secure by the use of the brackets 152 and the bars 154 to retain the top fairing 14 to the trailer 12. Although described as utilizing the bars 154 to secure the top fairing 14, the bars 154 are not used in other embodiments. In these instances, the frame 140 has flanges that are positioned under the brackets 152 and the brackets 152 are tightened down onto these flanges of the frame 140 to secure the frame 140 to the top surface 16. Additional securement by the double sided tape 146 will also aid in securing the top fairing 14 to the top surface 16.

Figure 22:
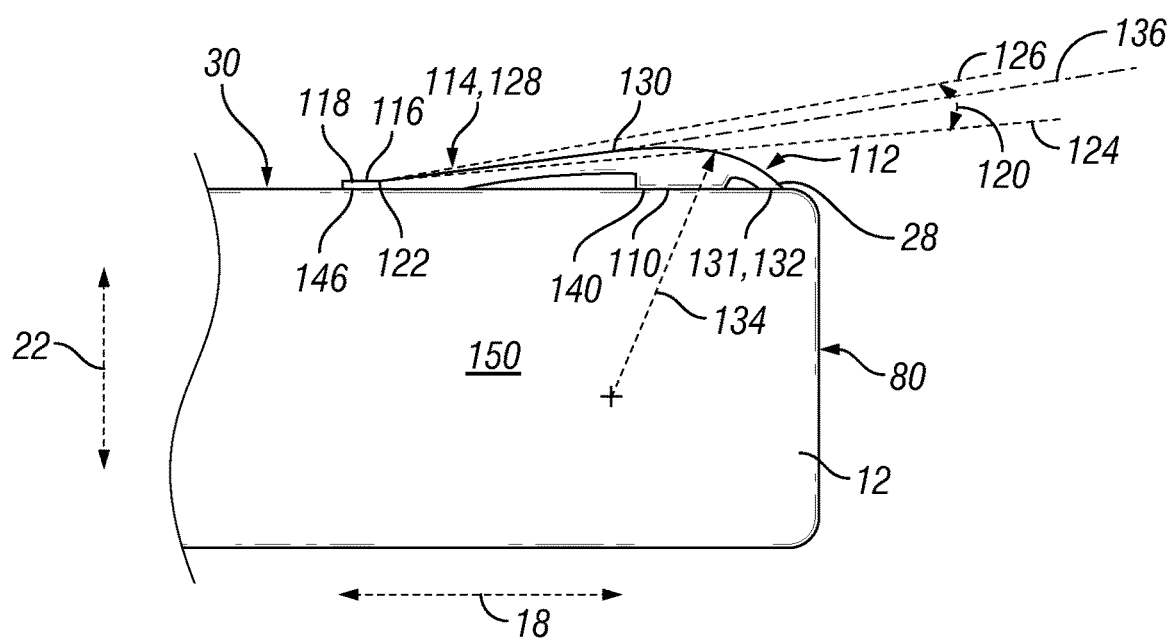
FIG. 22 is a top view of a back portion of the trailer with a side fairing.

Another embodiment of the fairing 14 is illustrated in FIG. 22 in which the fairing is a side fairing 24, 28. The variously described embodiments and variations as previously discussed with respect to the top fairing 14 are applicable as well to the side fairing 24, 28 and a repeat of this information is not necessary. The side fairing 24, 28 functions to direct the flow of air around the side of the trailer 12 and to an area behind the trailer to result in less drag on the trailer 12 when the tractor 42 is transporting the trailer 12. Although a second side fairing 24, 28 is not shown at the opposite side of the trailer 12 in the lateral direction 20 in FIG. 22, it is to be understood that such a second side fairing 24, 28 is present in other embodiments. The side fairing 24, 28 again has an anchoring flange 118 attached to the side surface 26, and a leading airflow surface 114 that follows the anchoring flange 118 in the longitudinal direction 18, and a tailing airflow surface 112 that follows the leading airflow surface 114 in the longitudinal direction 18. The anchoring flange 118 may include the chamfer 148 in some embodiments, and it may be provided at an angle from 15 degrees to 60 degrees to enhance the aerodynamic properties of the side fairing 24, 28.

The leading airflow surface 114 is again a flat surface that lies in a plane 128 and is completely contained from its leading edge 116 to the meeting location 130 within the angular range 120. The angular range 120 of the leading airflow surface 114 has a maximum range of degrees that are different than that as previously described with respect to the angular range 120 of the leading airflow surface 114 of the top surface 16. In this regard, the angular range 120 of the side fairing 24, 28 is from 5 degrees to 9 degrees. Again, the angular range 120 is measured with respect to the side surface 26 such that 0 degrees is parallel to the side surface 26, 5 degrees is at a 5 degree angle to the side surface 26, 9 degrees is at a 9 degree angle to the side surface 26, and so on. The orientation of the angular range 120 is rearward in the longitudinal direction 18 in that the arms 62, 64 of the angular range 120 extend rearward in the longitudinal direction 18 from the vertex 122. In more preferred embodiments, the angular range 120 is from 6.2 degrees to 8.2 degrees. In a preferred embodiment, the angular range 120 is 7.2 degrees.

The entire leading airflow surface 114 is located within the angular range 120, and the leading airflow surface 114 has a common tangent line 136 with the tailing airflow surface 112 at the meeting location 130. The tailing airflow surface 112 is a single curved surface with a single radius 134. The tailing airflow surface terminal end 131 is located at the terminal tailing end 132 of the fairing 10 and is forward of the back end 80 in the longitudinal direction 18. The side surface 26 may translate to the back end 80 by way of a radius or curved corner, and the tailing airflow surface terminal end 131 and the terminal tailing end 132 may both be forward of this radius or curved corner in the longitudinal direction 18. The tailing airflow surface 112 has a radius 134 that is from 550 millimeters to 1050 millimeters. In more preferred embodiments, the radius 134 is from 884 millimeters to 984 millimeters. In a preferred embodiment, the radius 134 is 934 millimeters. Selection of a radius 134 within the listed ranges/distance provides airflow around the side fairing 24, 28 to reduce drag, and this selection coupled with the tangency at the meeting location 130 along with the angle of the leading airflow surface 114 provides beneficial aerodynamic properties to the side fairing 24, 28.

The frame 140 engages the side surface 26 and is located below the tailing airflow surface 112 and is not below the leading airflow surface 114. The frame 140 is spaced along the underside of the tailing airflow surface 112 so as to be spaced from both the meeting location 130 and the terminal tailing end 132 in the longitudinal direction 18. A gap 138 can be present to space the leading airflow surface 114 from the side surface 26 so that these surfaces 14, 34 do not engage one another.

Figure 23:
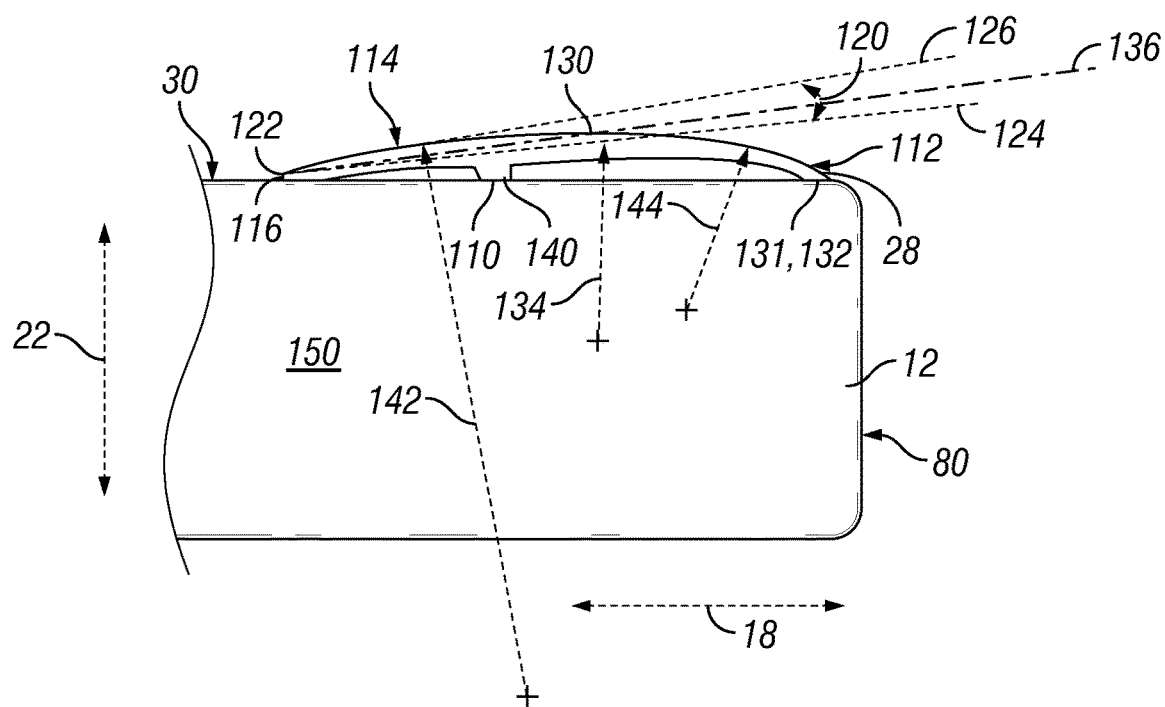
FIG. 23 is a top view of a back portion of the trailer with a side fairing in accordance with a different exemplary embodiment.

The side fairing 24, 28 is shown in another embodiment with reference to FIG. 23. Again, the side fairing 24, 28 may be configured the same as in other exemplary embodiments and a repeat of this information is not necessary. The side fairing 24, 28 lacks an anchoring flange 118 and the leading edge 116 forms the terminal forward end of the side fairing 24, 28 in the longitudinal direction 18. The vertex 122 is located at the leading edge 116, and the angular range 120 is again from 5 degrees to 9 degrees for the side fairing 24, 28 with a preferred range of 6.2 degrees to 8.2 degrees. The entire leading airflow surface 114 is within the angular range 120, and the leading airflow surface 114 is not flat but is instead curved with a leading airflow surface radius 142 that is larger than 2000 millimeters. The tailing airflow surface 112 is made up of multiple curved surfaces with their own radius. However, all of the radii of the curved surfaces making up the tailing airflow surface are from 550 millimeters to 1050 millimeters. This range is for individual radii and not for the addition of all of the radii such that each one of the radii 134, 144 are by itself within this range. The tailing airflow surface 112 terminates at the side surface 26 and the terminal tailing end 132 and the tailing airflow surface terminal end 131 are coincident. These ends 131, 132 are forward of the back end 80 in the longitudinal direction 18 and are forward of rounded corners that transition the trailer 12 from the side surface 26 to the back end 80 in the longitudinal direction 18.

The curved leading airflow surface 114 and the portion of the tailing airflow surface 112 at the meeting location 130 both have a common tangent line 136. Again, both surfaces 114 and 112 are considered to exist at the meeting location 130 and they are tangent to one another at this point. This tangency helps to direct the flow of air across the side fairing 24, 28 at this location. The side fairing 24, 28 also has a frame 140 that engages the side surface 26 and is inboard of most of the leading airflow surface 114 in the lateral direction 20 and is between and spaced from both the meeting location 130 and the leading edge 116 in the longitudinal direction 18. Although not shown on the left side of the trailer 12, an additional side fairing 24, 28 could be included and arranged in a similar manner as the one illustrated in FIG. 23.

Figure 24:
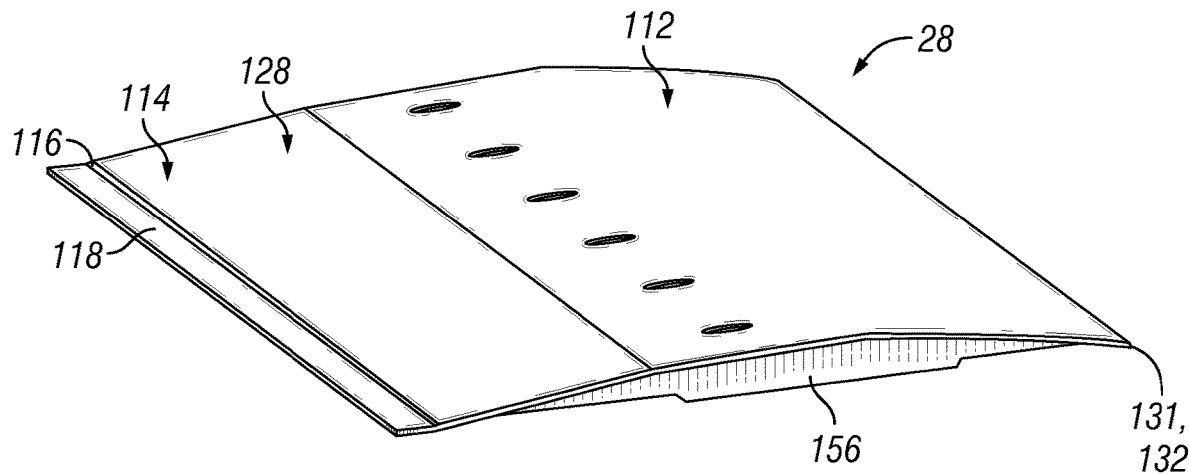
FIG. 24 is a perspective view of a side fairing.

FIG. 24 is a perspective view of the side fairing 24, 28 in which an anchoring flange 118 is present and the leading airflow surface 114 is flat and lays in a plane 128. The tailing airflow surface 112 is curved and a flange is located at the end of the side fairing 24, 28 with the terminal tailing end 132 at the flange. The side fairing 24, 28 can be attached to the side surface 26 through the use of bolts that extend through the leading airflow surface 114 or the tailing airflow surface 112 and into the side surface 26. The bolts may likewise extend through a frame 140 of the side fairing 24, 28 in some arrangements. The top and/or bottom of the side fairing 24, 28 in the vertical direction 22 can be provided with a sidewall 156 that functions to close the interior of the side fairing 24, 28 and that may act to direct airflow around the side fairing 24, 28 or prevent disruption of airflow at the side fairing 24, 28 to prevent drag. Although shown with the sidewall 156, it is to be understood that the sidewall 156 need not be present in other exemplary embodiments of the side fairing 24, 28. Further, the sidewall 156 may likewise be present in embodiments of the top fairing 14. The sidewalls 156 may also function to prevent deformation of the fairing 10.

Figure 25:
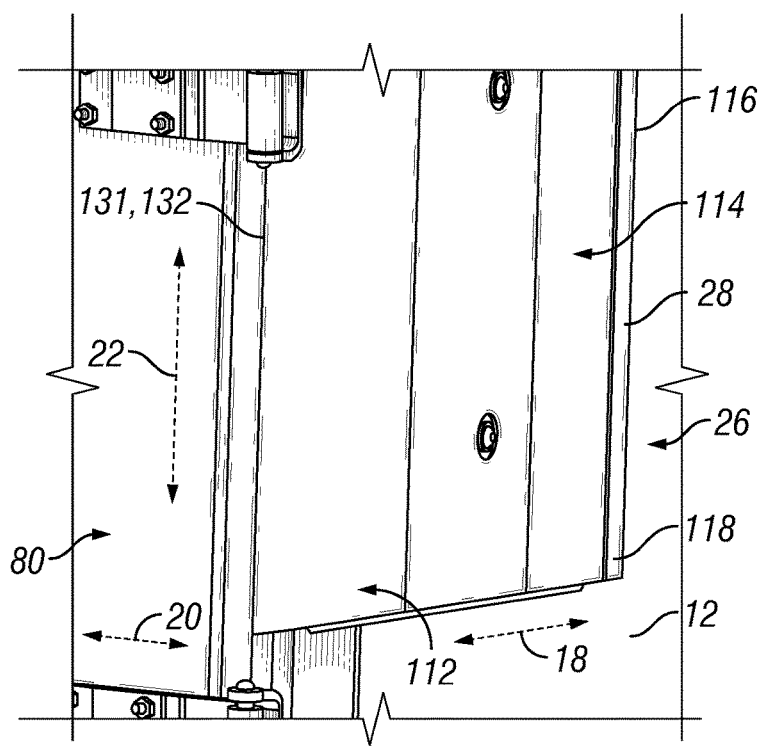
FIG. 25 is a perspective view of a back portion of a trailer with a side fairing attached.

FIG. 25 shows the side fairing 24, 28 attached to the side surface 26 via bolts into the side surface 26. The side fairing 24, 28 is configured relative to the back door of the trailer 12 so that the back door may be opened and closed without interference with the side fairing 24, 28. The tailing airflow surface 112 blends into the side surface 26 so there is a smooth transition of air flow between these members.

Figure 26:
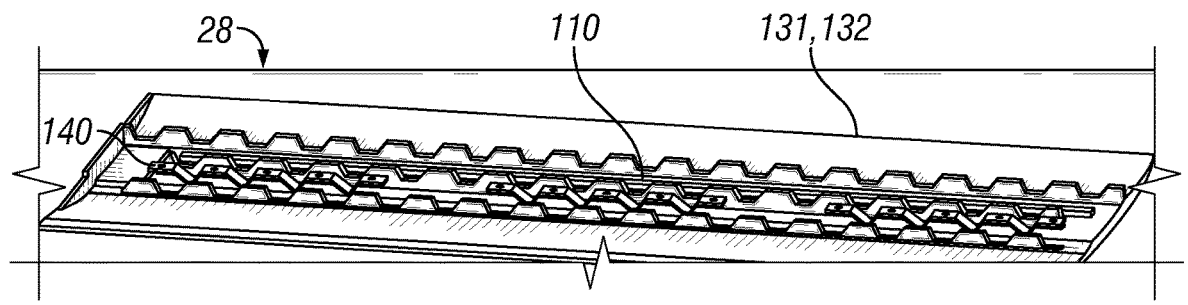
FIG. 26 is a perspective view of a side fairing showing ribs of the frame that are received within complimentary grooves of the trailer.

FIG. 26 shows the side fairing 24, 28 in which the frame 140 is provided with a series of ribs 110 that are provided in order to be located within complimentary grooves 108 of the trailer 12. The ribs 110 may be of any size or shape and are located at different spots on the frame 140 to allow the side fairing 24, 28 to be compatible with different trailers 12. The ribs 110 may still be present even when the side fairing 24, 28 is used with trailers 12 that do not have grooves 108. In this regard, the side fairing 24, 28 can be produced with ribs 110 and is compatible with trailers 12 with and without grooves 108 so that manufacturing benefits can be realized. The ribs 110 allow the side fairing 24, 28 to be common with both flat side surfaces 26, 30 and those that have grooves 108.

Figure 27:
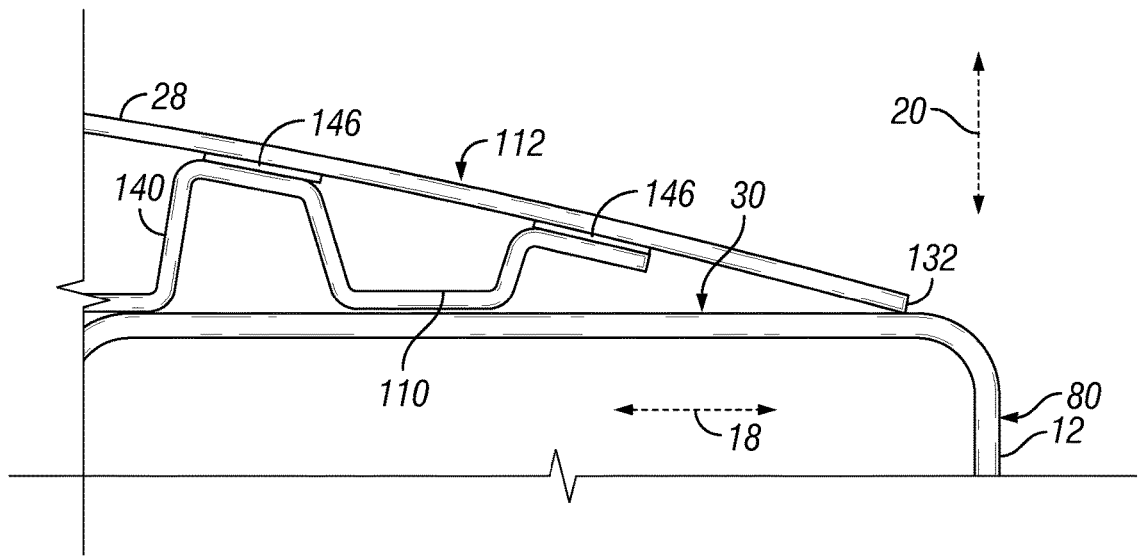
FIG. 27 is a top view of a back portion of a trailer that shows a frame engaging the side surface of the trailer and the bottom of a portion of the fairing that has the tailing airflow surface.

FIG. 27 is a top view of a back portion of the trailer 12 in which the side fairing 24, 28 is attached to the side surface 26. The frame 140 includes a series of ribs 110 and the frame 140 may be attached to the side surface 26 via bolts or adhesive. The frame 140 can be made of steel in some arrangements, or may be made of lighter weight materials as desired. The frame 140 is attached to the tailing airflow surface 112 by double sided tape 146 that engages both the tailing airflow surface 112 and the frame 140. Multiple strips of the double sided tape 146 can be present. The double sided tape 146 may not engage the ribs 110. The terminal tailing end 132 engages the side surface 26 but does not extend all the way to the back end 80 in the longitudinal direction 18 so that the terminal tailing end 132 is forward from the back end 80 in the longitudinal direction 18. The terminal tailing end 132 may engage the side surface 26 before the disclosed bend in the side surface 26 that transitions to the back surface which is the back end 80. The terminal tailing end 132 is thus forward in the longitudinal direction 18 from this bend.

Figure 28:
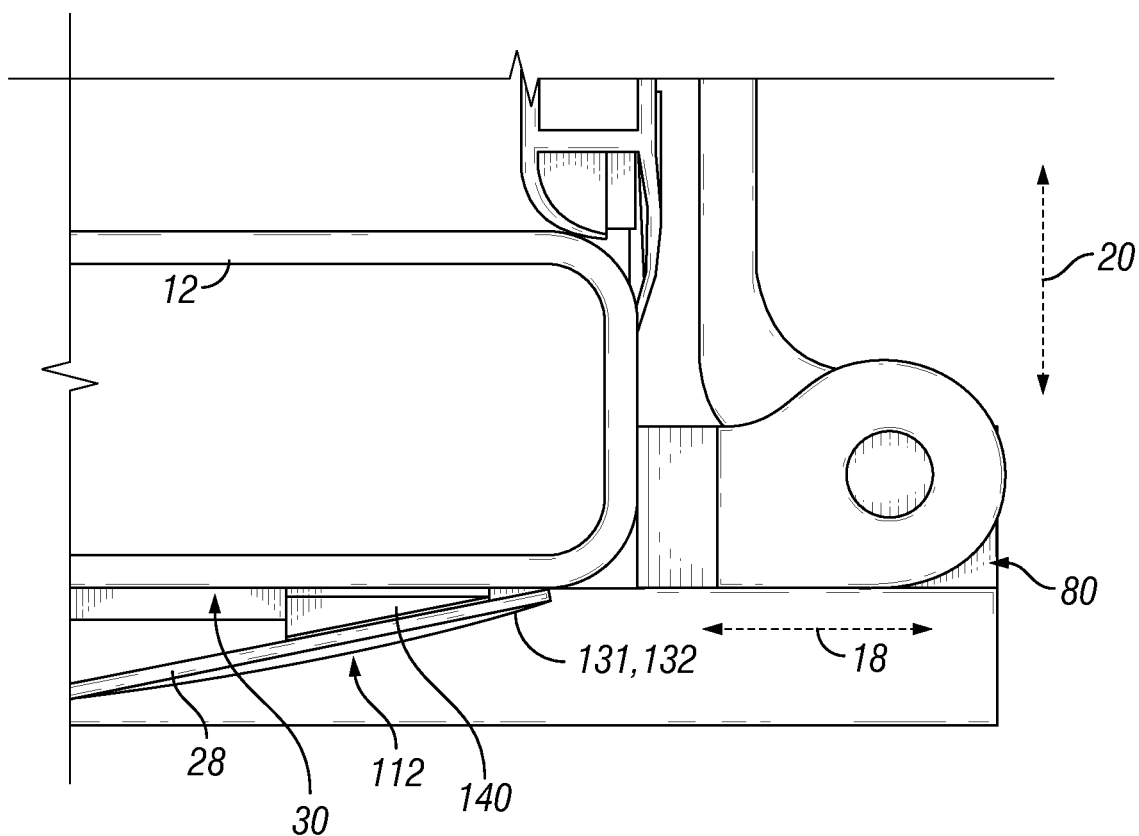
FIG. 28 is a top view of a back portion of the trailer that shows a wedge used to help mount the tailing airflow surface to the side surface of the trailer.
Figure 29:
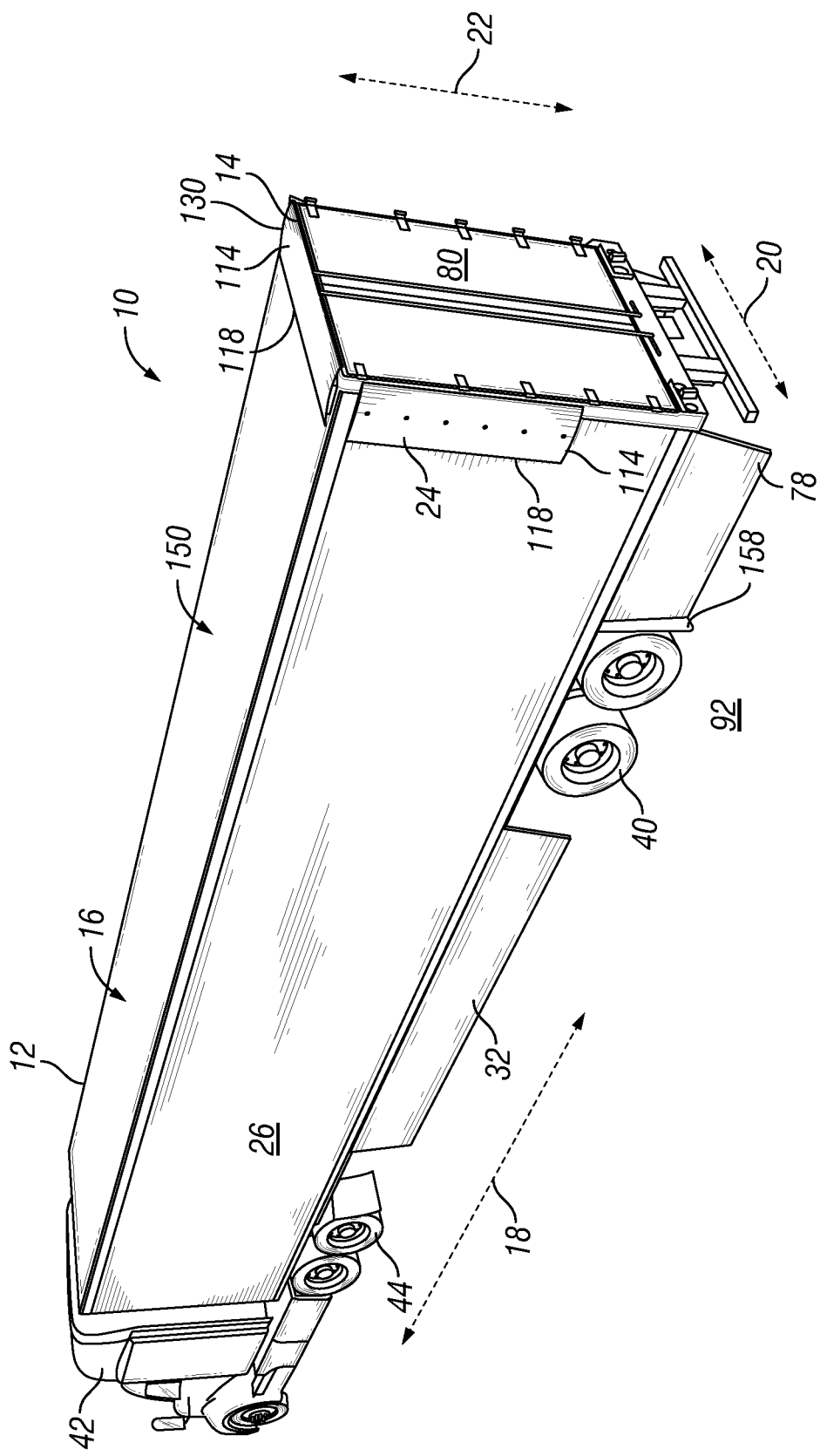
FIG. 29 is a back perspective view of a trailer with an apparatus in accordance with another exemplary embodiment.
Figure 30:
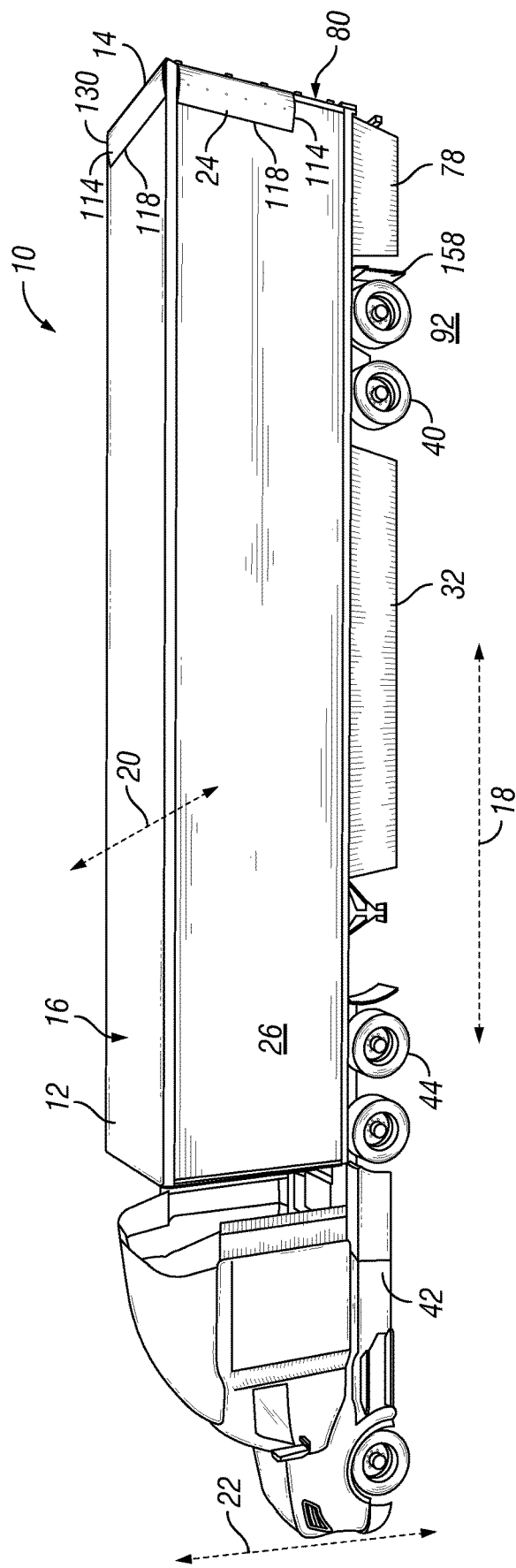
FIG. 30 is a side perspective view of the trailer and apparatus of FIG. 29.
Figure 31:
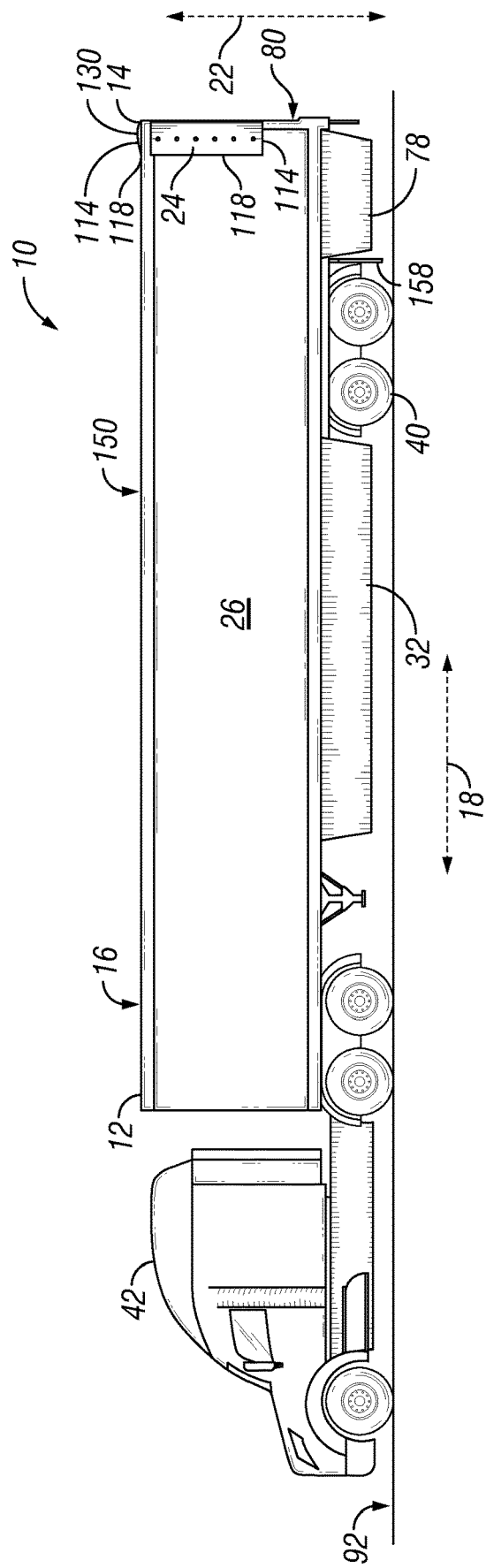
FIG. 31 is a side view of the trailer and apparatus of FIG. 29.
Figure 32:
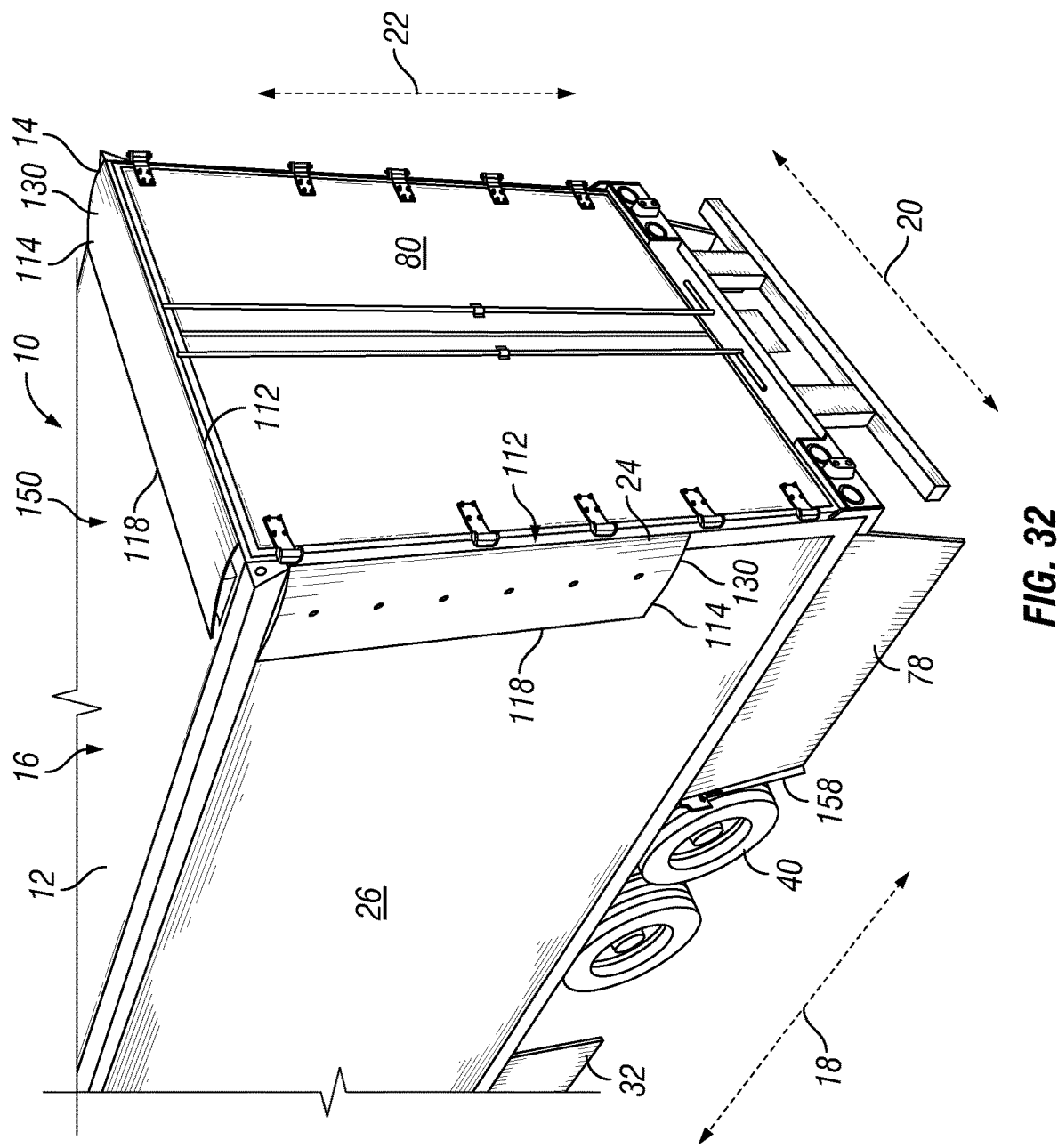
FIG. 32 is a close up perspective view of the back end of the trailer and apparatus of FIG. 29.

The frame 140 can be made of multiple sections that are contiguous with one another or that are spaced from one another and not in contact with one another. FIG. 28 shows a portion of the frame 140 that is wedge shaped and is located proximate to the terminal tailing end 132 of the side fairing 24, 28. Additional sections of the frame 140 could be present at other portions of the side fairing 24, 28 free from engagement with the wedge section, or the wedge section illustrated may be the only portion of the frame 140 in the side fairing 24, 28. The wedge section of the frame 140 is attached to the side surface 26 and the tailing airflow surface 112 by double sided tape, or through a different attachment mechanism in other exemplary embodiments. The wedge section of the frame 140 functions to support the tailing airflow surface 112 and to hold this portion of the side fairing 24, 28 to the side surface 26 at this location. The terminal tailing end 132 of the side fairing 24, 28 terminates forward of the back end 80 in the longitudinal direction 18. The terminal tailing end 132 and the coincident tailing airflow surface terminal end 131 are shown as engaging the trailer 12 forward of a bend in the trailer at the end of the side surface 26 and forward of the back end 80 in the longitudinal direction 18. In other versions, the ends 131, 132 may engage this bend, or may be free from engagement with this bend, or be rearward of the back end 80 in the longitudinal direction 18.

The design of the top fairing 14 and the side faring 24, 28 differ in that their angular ranges and their radii are different in magnitude from one another. As such, the fairing 14 disclosed may a leading airflow surface 114 with an angular range that is from 5 degrees to 14 degrees. The fairing 14 may have a curved tailing airflow surface 112 with a radius 134 that is in the range from 500 millimeters to 1050 millimeters. In this regard, should the tailing airflow surface 112 be constructed of multiple curved surfaces with each having its own radius, each of the radii would be in that disclosed range from 500 millimeters to 1050 millimeters.

Embodiments of the fairings exist in which the fairing, regardless of whether the fairing is the top fairing 14 or the side fairing 24, 28, is located at or forward from the back end 80 in the longitudinal direction 18 when the fairing is attached to the trailer 12. In this regard, although the fairing may be right at the back end 80 in the longitudinal direction 18, no portion of the fairing is located rearward of the back end 80 in the longitudinal direction 18. Still further, embodiments exist in which the fairing is spaced some distance from the back end 80 forward in the longitudinal direction 18, and no portion of the fairing is rearward to the back end 80 in the longitudinal direction 18.

The fairings, such as the top fairing 14 and side fairings 24, 28, and other portions of the apparatus 10 or trailer 12 can be provided as those set forth in international application number PCT/US2017/030297, entitled End of Trailer Fairing for Improved Aerodynamic Performance, filed on Apr. 29, 2017, the contents of which are incorporated herein by reference in their entirety for all purposes.

Another exemplary embodiment of the apparatus 10 on the trailer 12 is shown in FIGS. 29-32 and includes first and second trailer skirts 32, 36 and first and second trailer rear skirts 78, 82. Also included are first and second side fairings 24, 28 and a top fairing 14. The side fairings 24 and 28 do not extend the entire vertical heights of the first and second side surfaces 26, 30 but instead only extend partially along these heights. The side fairings 24, 28 are located closer to the upper surface 150 in the vertical direction 22 than they are to the first and second trailer rear skirts 78, 82. A larger gap may thus be present between the trailer rear skirts 78, 82 to the side fairings 24, 28 than the gap from the side fairings 24, 28 to the upper surface 150 in the vertical direction 22. The side fairings 24, 28 do not engage the top fairing 14 and stop short of the upper surface 150. The elements 32, 36, 78, 82, 24 and 28 can be provided as discussed herein and repeating this information is not necessary. Also, the apparatus 10 includes mudflaps 158 located just rearward of the rearward tire of the bogie assembly 40 in the longitudinal direction 18. The mudflaps 158 could be behind all of the rearward tires and may be provided in any number. The mudflaps 158 can be provided as disclosed in patent application number PCT/US18/53761 filed on Oct. 1, 2018 entitled "Aerodynamic Mudflap", the contents of which are incorporated herein by reference in their entirety for all purposes.

Figure 33:
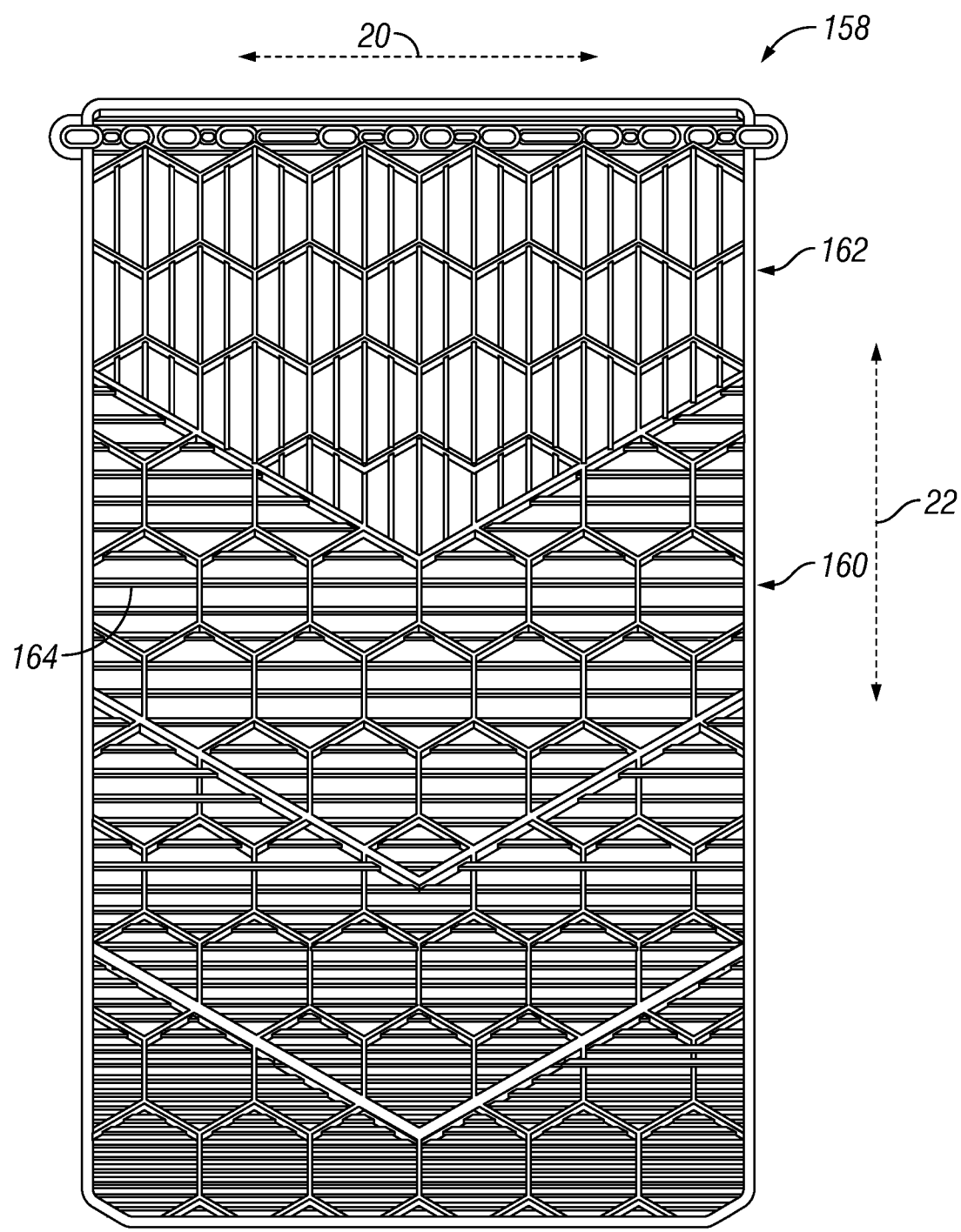
FIG. 33 is a front view of an aerodynamic mudflap that can be part of the apparatus in some embodiments.

The mudflap 158 that is included in the apparatus 10 is an aerodynamic mudflap in that it includes voids through which air may flow during driving so that less wind resistance is realized via the presence of the mudflap 158. FIG. 33 is a front view of one possible arrangement of the mudflap 158, and features a plurality of horizontally arranged horizontal louvers 164 in a barrier section 160 of the mudflap. The horizontal louvers 164 extend across almost the entire width of the mudflap 158 in the lateral direction 20. The horizontal louvers 164 are spaced from one another in the vertical direction 22. The spacing of successive horizontal louvers 164 in the vertical direction 22 increases from the bottom of the mudflap 158 towards the top of the mudflap 158 in the vertical direction 22. In some instances, the spacing always increases between successive horizontal louvers 164. In other instances, some of the successive horizontal louvers 164 have equal spacing from one another in the vertical direction 22. The spacing between horizontal louvers 164 allows some air to flow therethrough so that some air resistance savings are realized. The aerodynamic section 162 is designed to maximize airflow through the mudflap 158 and is located above the barrier section 160 in the vertical direction 22. The barrier section 160 may not include any of the horizontal louvers 164 in certain embodiments. It may be provided with vertical members and other honeycomb shaped structures to provide structural rigidity to the mudflap 158 yet allow air to pass.

Figure 34:
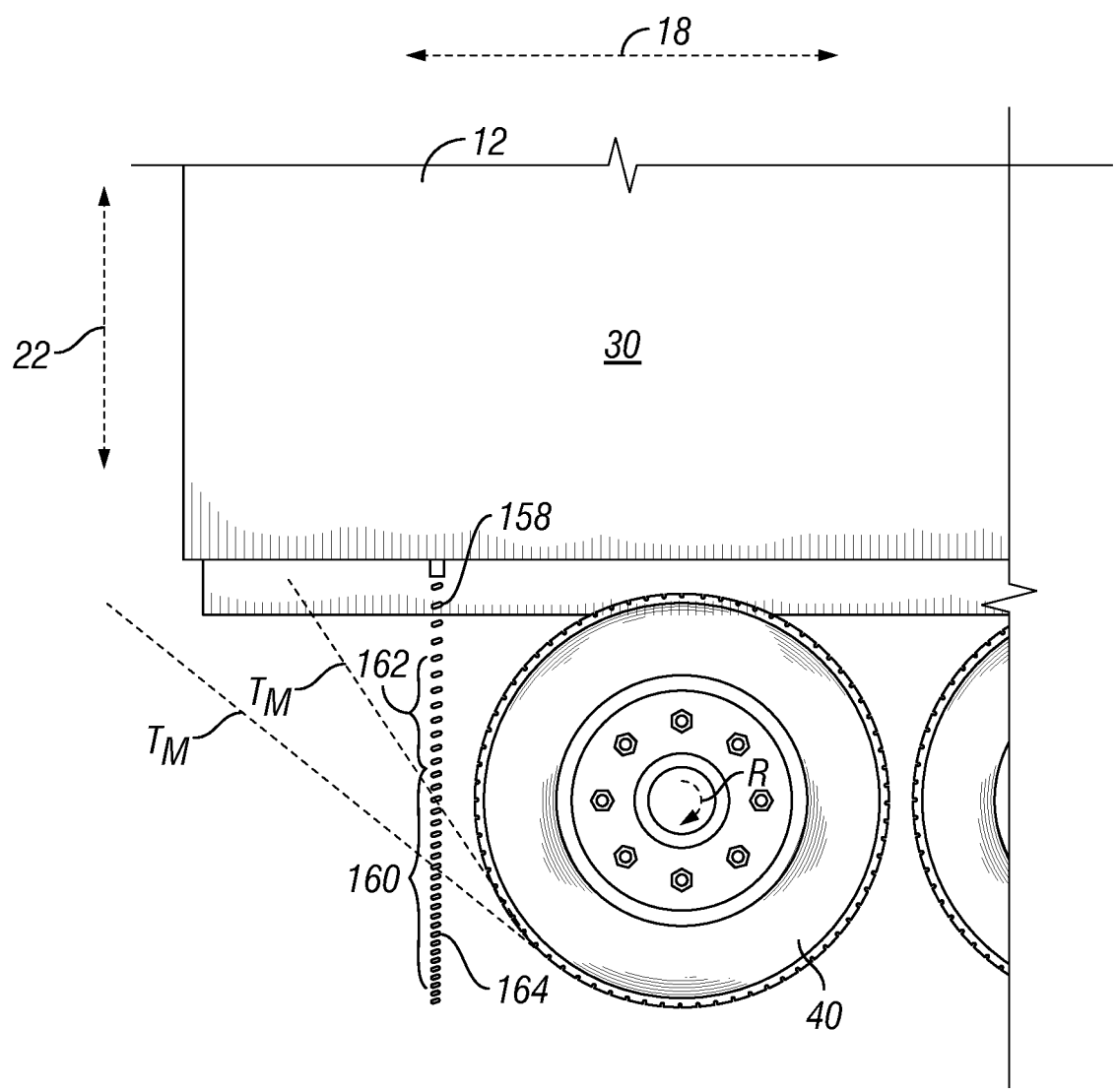
FIG. 34 is a side view of a portion of the back of the trailer showing the orientation of elements of the mudflap.

FIG. 34 shows the back end of the trailer 12 with the mudflap 158 incorporated into the apparatus 10, but other elements of the apparatus 10 are not illustrated for purposes of clarity. The rear tire of the bogie assembly 40 is immediately forward of the mudflap 158 in the longitudinal direction 18, and the barrier and aerodynamic sections 160, 162 are noted. Rotation of the tire in the direction R will direct water and materials off of the tire along lines indicated for example by lines $T_M$ in FIG. 34. The horizontal louvers 164 are angled such that the voids going between the horizontal louvers 164 travel through in an orientation having components that extend in both the longitudinal direction 18 and the vertical direction 22. The angled horizontal louvers 164 are oriented to stop the water and materials from lines such as lines $T_M$ from going through the mudflap 158. The aerodynamic section 162 need not have horizontal louvers 164, or may have them in some embodiments. It is anticipated that the higher positioning of the aerodynamic section 162 may minimize or prevent the need to block water and materials because they will not be directed that high up do to its positioning relative to the tire of the bogie assembly 40.

The top fairing 14 may be constructed so that it functions as half of an airfoil in that airflow can go over the top of the top fairing 14 but cannot go under the top fairing 14. With reference to FIG. 18, the leading edge 116 contacts or is otherwise adjacent the upper surface 150 at the anchoring flange 118 so that this area of the top fairing 14 is sealed to prevent all, or any noticeable/significant, air from flowing underneath the top fairing 14 to be between the top fairing 14 and the upper surface 150. Instead, air flows across the leading airflow surface 114 on the upper side of the top fairing 14 and is directed upwards in the vertical direction 22 and then upon further travel across the tailing airflow surface 112 on the upper side is directed downwards in the vertical direction 22. As such, the upper surface of the top fairing 14 is arranged so that forward travel of the trailer 12 results in airflow, moving rearward in the longitudinal direction 18, to be first directed upwards in the vertical direction 22 and then downwards in the vertical direction 22 off of the top fairing 14. When this occurs, there is no or negligible airflow under the top fairing 14 such that there is no airflow between the upper surface 150 and the top fairing 14. The term "negligible airflow" can be defined as meaning that the volume of airflow moving between the top fairing 14 and the upper surface 150 is less than 5% of the volume of airflow moving over the upper surface of the top fairing 14 when one measures the volume of the airflow from the top fairing 14 to a distance one inch above the top fairing 14.

The side fairings 24, 28 may be constructed in a similar manner as immediately discussed with respect to the top fairing 14. FIG. 22 shows the side fairing 28 (the side fairing 24 could be made the same way) with the leading edge 116 against the side surface 30. No, or negligible, air flows under the leading edge 116 such that no or negligible air will flow between the side surface 30 and the side fairing 28 in the longitudinal direction 18. The top of the side fairing 28 is shaped so that air will flow first outboard in the lateral direction 22 and then will flow inboard in the lateral direction 22 upon flowing forward to rearward in the longitudinal direction 18. In this regard, airflow can be directed outward in the lateral direction 22 across the leading airflow surface 114, and then subsequently inboard in the lateral direction 22 across the tailing airflow surface 112.

Regarding the back end 80 of the trailer 12, the top fairing 14 may extend past the back end 80 so as to be located rearward of the back end 80 in the longitudinal direction 18 as shown for example in FIGS. 18 and 19. Alternatively, the top fairing 14 may extend in the longitudinal direction 18 short of the back end 80 so that some portion of the upper surface 150 is visible and uncovered between the top fairing 14 and the back end 80, or the top fairing 14 could terminate in the longitudinal direction 18 right at the end of the upper surface 150 but not past the back end 80 as shown for example in FIG. 16. The side fairings 24, 28 may extend in the longitudinal direction 18 just short of the back end 80 so that some portion of the side surfaces 26, 30 are uncovered between the side fairings 24, 28 and the back end 80 as shown for example in FIGS. 22 and 23. Alternatively, in other embodiments the side fairings 24, 28 extend past the back end 80 in the longitudinal direction 18 and are thus behind the back end 80. The side fairings 24, 28 may be configured in the same manner as the top fairing 14 and these components can all be variously designed as discussed herein.

The apparatus 10 may be arranged so that the skirts 32, 36 and rear skirts 78, 82 are present, and the fairings 14, 24, 28 are likewise on the trailer 12 such that none of these elements extend past the back end 80 in the longitudinal direction 18. In these arrangements, the top fairing 14, the side fairing 24, and the side fairing 28 all stop short of the back end 80 so that none of them extend rearward of the back end 80 in the longitudinal direction 18. The apparatus 10 is arranged so that the top fairing 14 and side fairings 24, 28 do not form a boat tail. The fairings 14, 24, 28 are all set up so that greater than ½ of their aerodynamic functionality is located on the trailer 12 and less than ½ of their functionality is off of and behind the back end 80 of the trailer 12 in the longitudinal direction 18. A boat tail will have at least ½ of its aerodynamic function located rearward of the back end 80 in the longitudinal direction 18, and in many instances will have all of its aerodynamic functionality rearward of the back end 80 in the longitudinal direction 18. In so far as the fairings 14, 24, 28 are incorporated into the trailer 12 with the skirts 32, 36, 78, 82 this package will be placed onto a trailer 12 that lacks a boat tail, which could be a separate element from the apparatus 10 elements. A back end 80 that does not have a boat tail is shown, for example, in FIG. 29.

Figure 35:
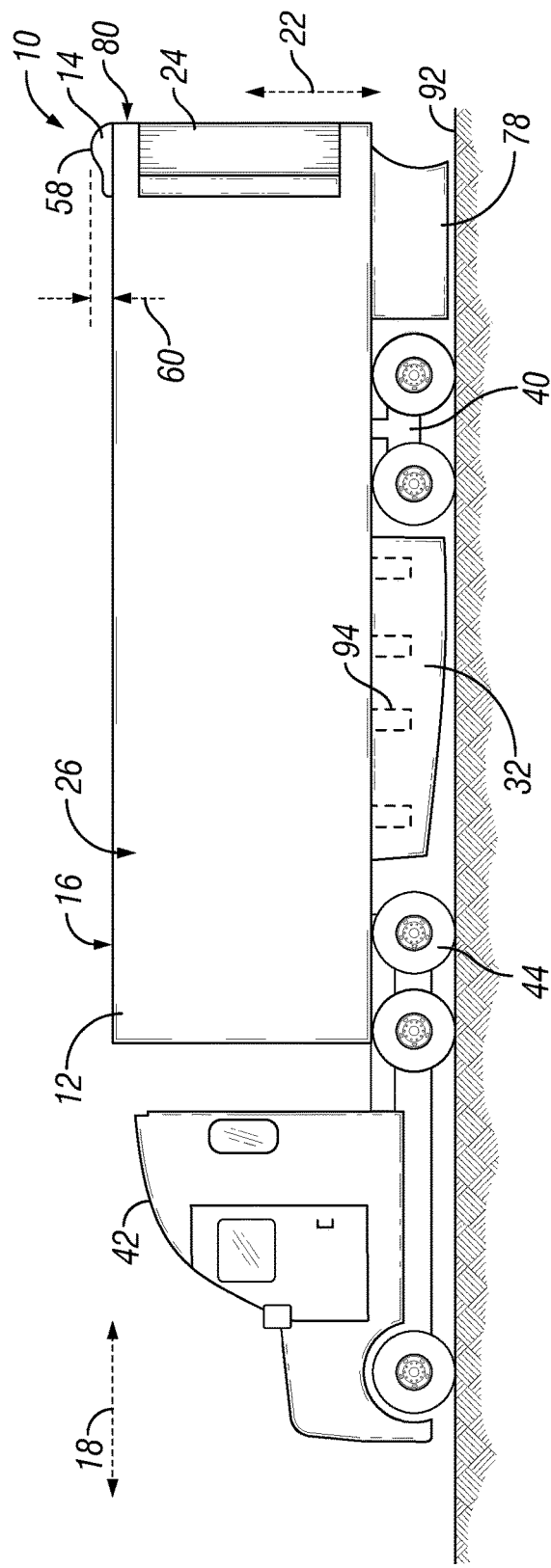
FIG. 35 is a side view of a trailer with a bogie assembly visible between two skirts.
Figure 36:
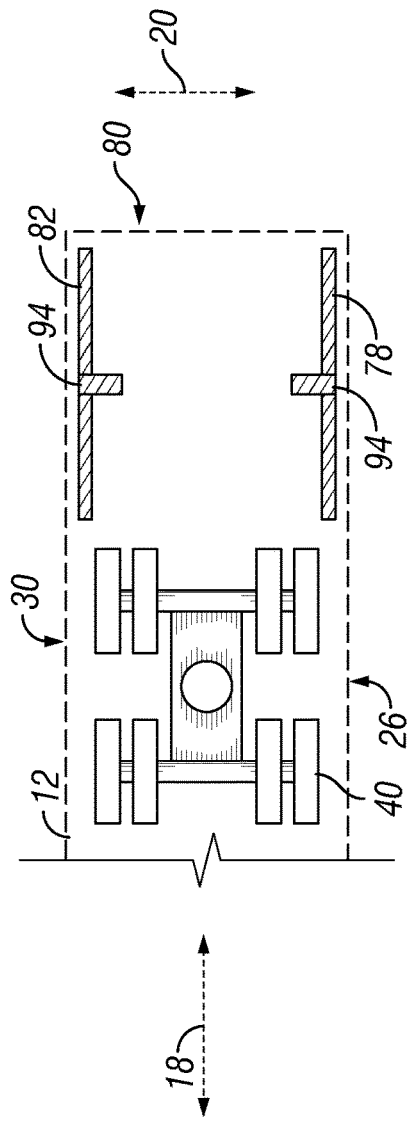
FIG. 36 is a top view in partial cross-section showing the trailer perimeter, bogie assembly, and trailer rear skirts of FIG. 35.

Another feature of the apparatus 10 involves provision of first and second trailer rear skirts 78 and 82 that are put onto the trailer 12 and allow for movement of the bogie assembly 40 in the longitudinal direction 18. FIG. 35 shows a side view of the trailer 12 with the bogie assembly 40 visible and between the first trailer skirt 32 and the first trailer rear skirt 78 in the longitudinal direction 18. FIG. 36 is a top partial cross-sectional view showing portions of the trailer 12 and apparatus 10 of FIG. 35 in which the perimeter of the trailer 12 is illustrated in dashed lines. The first and second trailer rear skirts 78, 82 are in cross-section and are positioned at the perimeter of the trailer 12 and are mounted thereto via brackets 94. The bogie assembly 40 is not in cross-section in the figure and is positioned completely forward of the rear skirts 78, 82 in the longitudinal direction 18. Trailers 12 include bogie assemblies 40 that are movable in the longitudinal direction 18 relative to the container section and other sections of the trailer 12. This movement is for adjusting for differently weighted or distributed contents of the trailer 12, or for trailer transport or loading/unloaded of the contents. The bogie assembly 40 is uncovered by all of the skirts 32, 36, 78 and 82 in the illustrated position and is visible.

Figure 37:
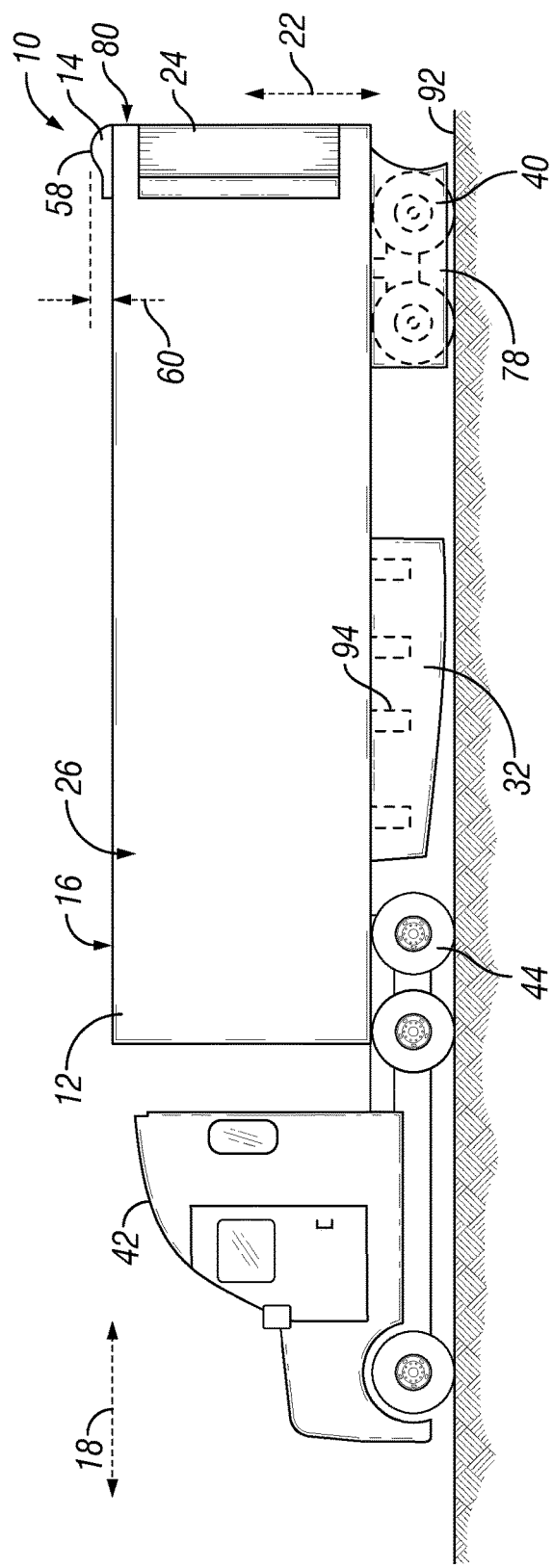
FIG. 37 is a side view of the trailer of FIG. 35 with the bogie assembly moved rearward and hidden via the trailer rear skirts.
Figure 38:
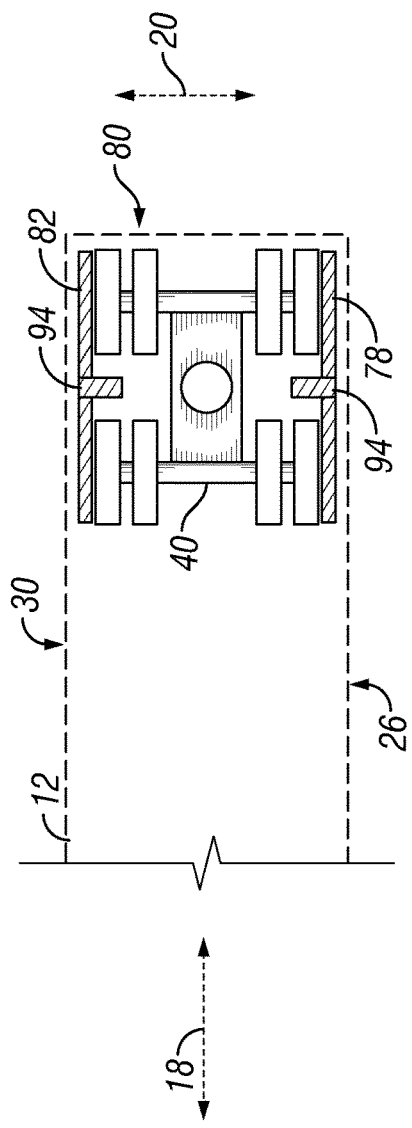
FIG. 38 is a top view in partial cross-section showing the trailer perimeter, bogie assembly, and trailer rear skirts of FIG. 37.

FIGS. 37 and 38 are views similar to those previously described with mention to FIGS. 35 and 36 but with the bogie assembly 40 moved rearward in the longitudinal direction 18 and covered by the trailer rear skirts 78, 82. The trailer rear skirts 78, 82 may cover the entire longitudinal length of the bogie assembly 40 as illustrated. In this regard, the leading forward edge of the bogie assembly 40 is at or rearward of the leading forward edge of the trailer rear skirts 78, 82 in the longitudinal direction 18. The tailing backward edge of the bogie assembly 40 is at or forward of the tailing backward edge of the trailer rear skirts 78, 82 in the longitudinal direction 18. The trailer rear skirts 78, 82 are arranged on the trailer 12 so that they do not interfere with the longitudinal sliding of the bogie assembly 40. The trailer rear skirts 78, 82 may both be located outboard of the bogie assembly 40 in the lateral direction 20. The panel of the trailer rear skirt 78 could be completely outboard of the bogie assembly 40 in the lateral direction 20, and the panel of the trailer rear skirt 82 may be completely outboard of the bogie assembly 40 in the lateral direction 20. The brackets 94 retaining the panels of the trailer rear skirts 78, 82 can be located above the tires of the bogie assembly 40 in the vertical direction 22 to afford clearance to all the trailer rear skirts 78, 82 to be mounted yet allow the bogie assembly 40 to move relative thereto. The trailer rear skirts 78, 82 could be at or located inboard from the side surfaces 26, 30 in the lateral direction 20. Although shown as being completely rearward of the trailer rear skirts 78, 82, the bogie assembly 40 could also be positioned so that part of it is covered by the trailer rear skirts 78, 82 and other parts are not covered by the trailer rear skirts 78, 82 in the longitudinal direction 18 in various exemplary embodiments. The bogie assembly 40 may thus be arranged to be movable in the longitudinal direction 18 relative to the trailer rear skirts 78, 82 so that at least the tailing end of the bogie assembly 40 can be moved rearward of the leading end of the trailer rear skirts 78, 82 in the longitudinal direction 18. In the embodiment disclosed in FIGS. 35-38, the entire bogie assembly 40 is movable completely forward of the trailer rear skirts 78, 82 and completely rearward of the leading forward end of the trailer rear skirts 78, 82 in the longitudinal direction 18.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. An apparatus for a trailer, comprising:
    a top fairing configured for being mounted to a top surface of the trailer, wherein the trailer has a longitudinal direction, a lateral direction, and a vertical direction, wherein the top fairing is configured to be located closer to the back of the trailer than to the front of the trailer in the longitudinal direction, wherein airflow across the top fairing in the longitudinal direction is over an upper surface of the top fairing and there is no or negligible airflow in the longitudinal direction between the top fairing and the top surface of the trailer, wherein the airflow across the upper surface of the top fairing in the longitudinal direction moves upward in the vertical direction and then subsequently downward in the vertical direction, wherein in the longitudinal direction from front to back the the upper surface extends in the vertical direction upwards away from the top surface of the trailer in the vertical direction and then downwards back towards the top surface of the trailer, wherein the upwards and downwards extension of the upper surface takes place at a location that is forward of a back end of the trailer in the longitudinal direction;
    a first trailer skirt configured to be carried by the trailer;
    a second trailer skirt configured to be carried by the trailer;
    a first trailer rear skirt configured to be located rearward of the first trailer skirt in the longitudinal direction, wherein the first trailer rear skirt and the first trailer skirt are configured to be located closer to a first side surface of the trailer than to a second side surface of the trailer in the lateral direction; and
    a second trailer rear skirt configured to be located rearward of the second trailer skirt in the longitudinal direction, wherein the second trailer rear skirt and the second trailer skirt are configured to be located closer to the second side surface of the trailer than to the first side surface of the trailer in the lateral direction;
    wherein a bogie assembly is movable in the longitudinal direction relative to the first and second trailer rear skirts, wherein the bogie assembly is movable such that at least a portion of the bogie assembly is positioned rearward of leading forward ends of the first and second trailer rear skirts in the longitudinal direction.

2. The apparatus as set forth in claim 1, further comprising a first side fairing configured for being mounted to a first side surface of the trailer, wherein the first side fairing is configured to be located closer to the back of the trailer than to the front of the trailer in the longitudinal direction; and
    a second side fairing configured for being mounted to a second side surface of the trailer, wherein the second side fairing is configured to be located closer to the back of the trailer than to the front of the trailer in the longitudinal direction.

3. The apparatus as set forth in claim 2, wherein the first side fairing engages the top fairing, and wherein the second side fairing engages the top fairing.

4. The apparatus as set forth in claim 1, further comprising:
    wherein the first trailer skirt is configured to be oriented such that the first side surface of the trailer extends in the longitudinal direction and the first trailer skirt is oriented at an angle from 0-20 degrees to the first side surface of the trailer in the direction of extension of the first trailer skirt forward in the longitudinal direction; and
    wherein the second trailer skirt is configured to be oriented such that the second side surface of the trailer extends in the longitudinal direction and the second trailer skirt is oriented at an angle from 0-20 degrees to the second side surface of the trailer in the direction of extension of the second trailer skirt forward in the longitudinal direction.

5. The apparatus as set forth in claim 4, wherein the angle of the first trailer skirt to the first side surface of the trailer is measured by taking a first line from a rearward most point of the first trailer skirt in the longitudinal direction to a forward most point of the first trailer skirt in the longitudinal direction; and
    wherein the angle of the second trailer skirt to the second side surface of the trailer is measured by taking a second line from a rearward most point of the second trailer skirt in the longitudinal direction to a forward most point of the second trailer skirt in the longitudinal direction.

6. The apparatus as set forth in claim 1, wherein the first trailer skirt is configured to be oriented relative to the trailer such that the first trailer skirt extends constantly inboard in the lateral direction upon extension from the rearward most point of the first trailer skirt in the longitudinal direction to the forward most point of the first trailer skirt in the longitudinal direction; and
    wherein the second trailer skirt is configured to be oriented relative to the trailer such that the second trailer skirt extends constantly inboard in the lateral direction upon extension from the rearward most point of the second trailer skirt in the longitudinal direction to the forward most point of the second trailer skirt in the longitudinal direction.

7. The apparatus as set forth in claim 2, wherein the top fairing has a height that extends from the top surface of the trailer to an upper terminal point of the top fairing in the vertical direction;
    wherein the first side fairing has a width that extends from the first side surface of the trailer to an outer terminal point of the first side fairing in the lateral direction;
    wherein a magnitude of the height of the top fairing is greater than a magnitude of the width of the first side fairing;
    wherein the second side fairing has a width that extends from the second side surface of the trailer to an outer terminal point of the second side fairing in the lateral direction; and
    wherein the magnitude of the height of the top fairing is greater than a magnitude of the width of the second side fairing.

8. The apparatus as set forth in claim 2, wherein the first side fairing does not engage the top fairing, and wherein the second side fairing does not engage the top fairing.

9. The apparatus as set forth in claim 1, wherein:
the first trailer rear skirt is located within 0.5 meters of the back end of the trailer in the longitudinal direction; and
the second trailer rear skirt is located within 0.5 meters of the back end of the trailer in the longitudinal direction.

10. The apparatus as set forth in claim 1, further comprising a mudflap that is located rearward of a tire of the bogie assembly in the longitudinal direction, wherein the mudflap has a plurality of horizontally arranged horizontal louvers that allow water and materials to move through the mudflap.

11. The apparatus as set forth in claim 1, wherein the first trailer skirt does not engage the first trailer rear skirt, and wherein the second trailer skirt does not engage the second trailer rear skirt.

12. The apparatus as set forth in claim 1, further comprising:
a first connecting portion that extends from the first trailer skirt to the first trailer rear skirt assembly of the trailer, wherein the first trailer skirt, the first trailer rear skirt, and the first connecting portion define a continuous surface; and
a second connecting portion that extends from the second trailer skirt to the second trailer rear skirt and covers at least a portion of the bogie assembly, wherein the second trailer skirt, the second trailer rear skirt, and the second connecting portion define a continuous surface.

13. The apparatus as set forth in claim 1, wherein the first trailer rear skirt has a forward section that is parallel to the first side surface and a rearward section that is angled relative to the forward section of the first trailer rear skirt and extends rearward in the longitudinal direction from the forward section of the first trailer rear skirt inboard in the lateral direction; and
wherein the second trailer rear skirt has a forward section that is parallel to the second side surface and a rearward section that is angled relative to the forward section of the second trailer rear skirt and extends rearward in the longitudinal direction from the forward section of the second trailer rear skirt inboard in the lateral direction.

14. The apparatus as set forth in claim 1, wherein the top fairing extends rearward of the back end of the trailer in the longitudinal direction.

15. The apparatus as set forth in claim 2, wherein the top fairing, the first side fairing, and the second side fairing do not extend rearward of the back end of the trailer in the longitudinal direction.

16. The apparatus as set forth in claim 2, wherein the top fairing, the first side fairing, the second side fairing, the first trailer rear skirt, and the second trailer rear skirt do not have any moving parts during use of the trailer.

17. The apparatus as set forth in claim 1, wherein the bogie assembly is movable such that the entire bogie assembly is positioned rearward of the leading forward ends of the first and second trailer rear skirts in the longitudinal direction.

18. The apparatus as set forth in claim 2, wherein the first side fairing has a height in the vertical direction that is less than a height of the first side surface in the vertical direction such that the first side fairing does not extend along the entire height of the first side surface, wherein the second side fairing has a height in the vertical direction that is less than a height of the second side surface in the vertical direction such that the second side fairing does not extend along the entire height of the second side surface.

19. The apparatus as set forth in claim 2, wherein greater than one half of the functionality of the top fairing is located on the trailer with the remainder of the functionality located off of the trailer rearward of the back end of the trailer in the longitudinal direction, wherein greater than one half of the functionality of the first side fairing is located on the trailer with the remainder of the functionality located off of the trailer rearward of the back end of the trailer in the longitudinal direction, and wherein greater than one half of the functionality of the second side fairing is located on the trailer with the remainder of the functionality located off of the trailer rearward of the back end of the trailer in the longitudinal direction.

* * * * *